US012657095B2

(12) United States Patent
Oh

(10) Patent No.: US 12,657,095 B2
(45) Date of Patent: Jun. 16, 2026

(54) DISTRIBUTED STORAGE SYSTEM AND OPERATING METHOD THEREOF

(71) Applicant: SAMSUNG ELECTRONICS CO., LTD., Suwon-si (KR)

(72) Inventor: Myoungwon Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 4 days.

(21) Appl. No.: 18/987,690

(22) Filed: Dec. 19, 2024

(65) Prior Publication Data

US 2025/0217239 A1 Jul. 3, 2025

(30) Foreign Application Priority Data

Jan. 3, 2024 (KR) ........................ 10-2024-0001060

(51) Int. Cl.
*G06F 11/16* (2006.01)
*G06F 11/20* (2006.01)

(52) U.S. Cl.
CPC ...... *G06F 11/1612* (2013.01); *G06F 11/2094* (2013.01)

(58) Field of Classification Search
CPC ........................ G06F 11/1612; G06F 11/2094
See application file for complete search history.

(56) References Cited

U.S. PATENT DOCUMENTS 10,277,677 B2 4/2019 Nachimuthu et al.
10,503,587 B2 12/2019 Chagam Reddy et al.

| 10,860,508 | B2 | 12/2020 | Bolkhovitin et al. |
| 11,405,455 | B2 | 8/2022 | Enz |
| 11,531,498 | B2 | 12/2022 | Moshe et al. |
| 11,567,834 | B2 * | 1/2023 | Bent ...................... G06F 3/0664 |
| 2022/0057947 | A1 | 2/2022 | Sangle et al. |
| 2022/0269412 | A1 * | 8/2022 | Levy ....................... G06F 3/067 |
| 2023/0059248 | A1 | 2/2023 | Xu et al. |
| 2023/0126072 | A1 * | 4/2023 | Levy ................... G06F 11/2094 726/26 |
| 2023/0185822 | A1 | 6/2023 | Lee et al. |

(Continued)

OTHER PUBLICATIONS

Ana Klimovic et al, "Flash Storage Disaggregation," EuroSys '16 Apr. 18-21, 2016, London, United Kingdom, DOI: http://dx.doi.org/10.1145/2901318.2901337, total 15 pages.

(Continued)

*Primary Examiner* — Bryce P Bonzo
*Assistant Examiner* — Xinyuan Yu
(74) *Attorney, Agent, or Firm* — Sughrue Mion, PLLC

(57) ABSTRACT

Provided is an operating method of a distributed storage system, the distributed storage system including a first domain including a plurality of computing nodes and a plurality of storage nodes communicating with the plurality of computing nodes via a non-volatile memory express over fabrics protocol and a distribution manager. A second node communicates via a first node. The operating method includes detecting, occurrence of failure of the first node in the first domain; and performing, a recovery operation based on a first tree and a second tree in response to the occurrence of failure being detected by re-allocating, a third node of the first domain to the second node, whereby the second node is able to communicate via the third node.

20 Claims, 18 Drawing Sheets

(56) References Cited

U.S. PATENT DOCUMENTS

2023/0205445 A1    6/2023  Nair et al.
2023/0305726 A1*  9/2023  Ben Romdhane .... G06F 3/0644

OTHER PUBLICATIONS

Nanqinqin Li et al, "Speculative Recovery: Cheap, Highly Available Fault Tolerance with Disaggregated Storage," USENIX Association, 2022 USENIX Annual Technical Conference, pp. 271-286 (total 17 pages).

* cited by examiner

S210

In tree 2, determine fault domain including storage node allocated to failed compute node — S222

In tree 2, select peer storage node among a plurality of storage nodes included in fault domain — S224

Determine compute node allocated to peer storage node as node 3 — S226

Re-allocate node 3 to node 2 — S228

End

S210

| | |
|---|---|
| Determine storage node allocated to failed compute node | S221 |

| | |
|---|---|
| In tree 2, determine fault domain including storage node allocated to failed compute node | S222 |

| | |
|---|---|
| In tree 2, select peer storage node among a plurality of storage nodes included in fault domain | S224 |

| | |
|---|---|
| Determine compute node allocated to peer storage node as node 3 | S226 |

| | |
|---|---|
| Re-allocate node 3 to node 2 | S228 |

| | |
|---|---|
| Update tree 1 | S229 |

End

DISTRIBUTED STORAGE SYSTEM AND OPERATING METHOD THEREOF

CROSS-REFERENCE TO RELATED APPLICATION

This application is based on and claims priority under 35 U.S.C. § 119 to Korean Patent Application No. 10-2024-0001060, filed on Jan. 3, 2024, in the Korean Intellectual Property Office, the disclosure of which is incorporated by reference herein in its entirety.

BACKGROUND

Embodiments are related to a storage system, and more particularly, to a distributed storage system and an operating method thereof.

Semiconductor memory devices are classified into volatile memory devices in which, when the supply of power is cut off, stored data are lost, such as static random-access memory (SRAM), dynamic RAM (DRAM), etc., and non-volatile memory devices in which, even when the supply of power is cut off, stored data are maintained, such as phase-change RAM (PRAM), magnetic RAM (MRAM), resistive RAM (RRAM), ferroelectric RAM (FRAM), etc.

A distributed storage system in a data center may include a plurality of server nodes each including an arithmetic unit and a storage unit, and data can be distributed and stored in the plurality of server nodes. To ensure availability, the distributed storage system can replicate the same data in multiple server nodes.

In recent years, research has been conducted to reorganize a server-centric structure of a distributed storage system into a resource-centric structure. In a disaggregated storage system having a resource-centric structure, computing nodes that perform arithmetic functions and storage nodes performing storing functions can be physically disaggregated from each other.

SUMMARY

Embodiments provide a distributed storage system and an operating method thereof.

Provided herein is an operating method of a distributed storage system, the distributed storage system including a domain including a plurality of computing nodes and a plurality of storage nodes communicating with the plurality of computing nodes via a non-volatile memory express over fabrics (NVMe-oF) protocol and a distribution manager, the operating method including: detecting, by the distribution manager, an occurrence of a failure of a first node in the domain, wherein a second node communicates in the distributed storage system via the first node; and performing, by the distribution manager, a recovery operation based on a first tree and a second tree in response to the occurrence of the failure by re-allocating a third node of the domain to the second node, whereby the second node is able to communicate in the distributed storage system via the third node, wherein the first tree is generated based on a logical connection state between the plurality of computing nodes and the plurality of storage nodes and a storage capacity of the plurality of storage nodes, and the second tree is generated based on a physical connection state between the plurality of computing nodes and the plurality of storage nodes and a usage rate of the plurality of storage nodes.

Also provided herein is a distributed storage system including: a plurality of computing nodes; a plurality of storage nodes configured to communicate with the plurality of computing nodes through a non-volatile memory express over fabrics (NVMe-oF) protocol; and a distribution manager configured to detect a first node in which a failure has occurred, wherein a second node communicates in the distributed storage system via the first node, and to perform a recovery operation based on a first tree and a second tree by re-allocating a third node of a fault domain to the second node, whereby the second node is able to communicate in the distributed storage system via the third node, and wherein the fault domain includes the second node, wherein the first tree is generated based on a logical connection state between the plurality of computing nodes and the plurality of storage nodes and a storage capacity of the plurality of storage nodes, and the second tree is generated based on a physical connection state between the plurality of computing nodes and the plurality of storage nodes and a usage rate of the plurality of storage nodes.

Also provided herein is an operating method of a distributed storage system, the distributed storage system including a domain including a plurality of computing nodes and a plurality of storage nodes communicating with the plurality of computing nodes via a non-volatile memory express over fabrics (NVMe-oF) protocol and a distribution manager, the operating method including: detecting, by the distribution manager, an occurrence of a failure of a first node, wherein a second node communicates in the distributed storage system via the first node; determining a fault domain including the second node as a storage node based on a first tree and determining a second tree based on the first node being a computing node; selecting, from the second tree, a peer storage node among a second plurality of storage nodes included in the fault domain; determining a third node that is a computing node, wherein the third node is allocated to the peer storage node; and re-allocating the third node to the second node, whereby the second node is able to communicate in the distributed storage system via the third node, wherein the first tree is generated based on a logical connection state between the plurality of computing nodes and the plurality of storage nodes and a storage capacity of the plurality of storage nodes, and the second tree is generated based on a physical connection state between the plurality of computing nodes and the plurality of storage nodes and a usage rate of the plurality of storage nodes.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Hereinafter, embodiments will be described clearly and in detail.

Figure 1:
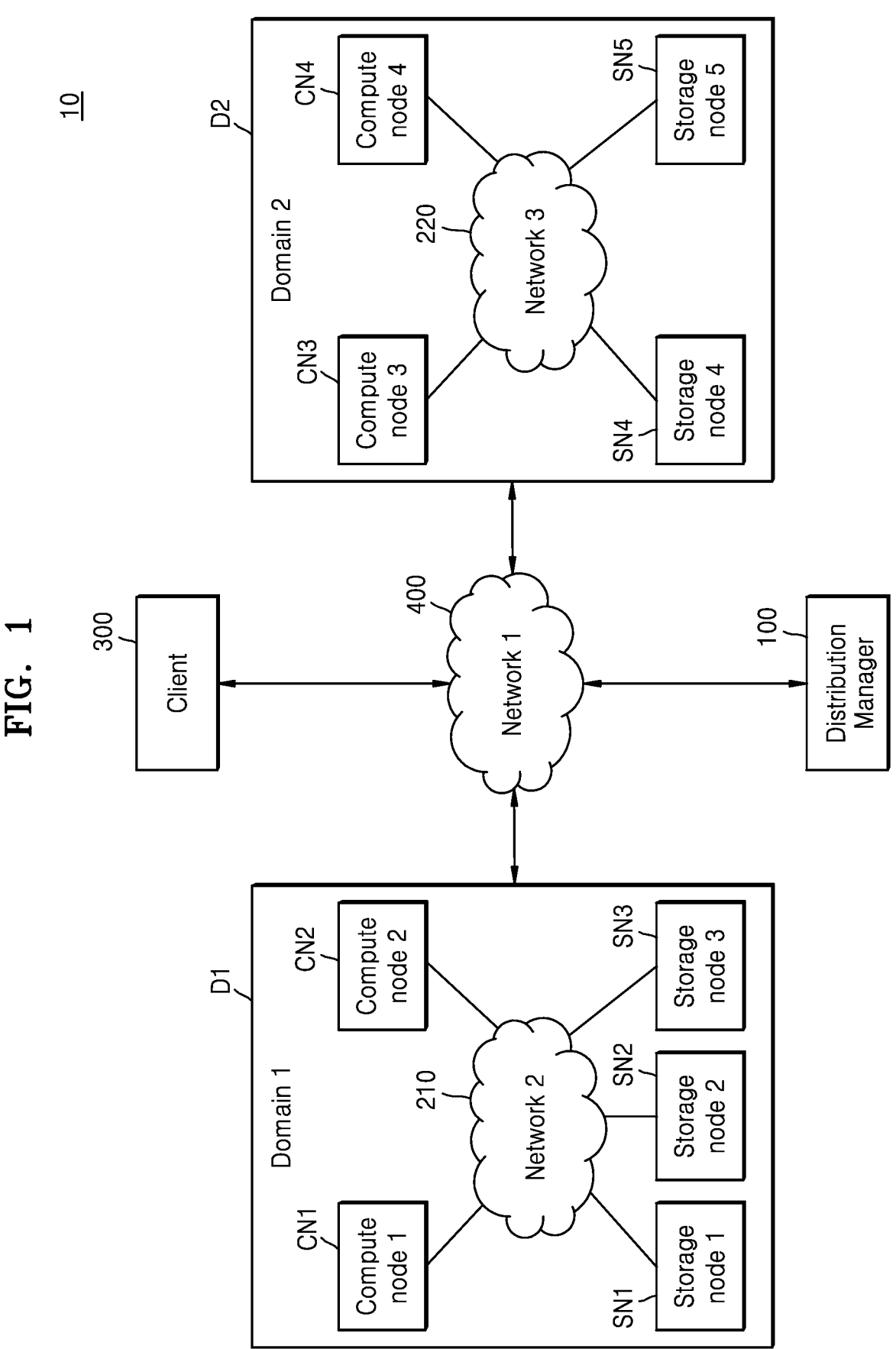
FIG. 1 is a block diagram illustrating a distributed storage system according to an embodiment.

FIG. 1 is a block diagram illustrating a distributed storage system according to an embodiment.

Referring to FIG. 1, a distributed storage system 10 may include a distribution manager 100, a plurality of computing nodes, a plurality of storage nodes, and a client 300. The distributed storage system 10 may include the distribution manager 100, a domain, and the client 300. In an embodiment, the distributed storage system 10 may include the distribution manager 100, a first domain D1, a second domain D2, and the client 300. However, the scope is not limited thereto, and the number of domains and the number of clients may be decreased or increased according to implementations.

The distribution manager 100, the first domain D1, the second domain D2, and the client 300 may communicate with each other via a first network 400. The first network 400 may be implemented using a fibre channel (FC), Ethernet, or the like. In this case, the FC may be a medium used for relatively high-speed data transmission and may use a light switch that provides high performance/high availability.

In an embodiment, the first network 400 may be a storage-only network such as a storage area network (SAN). For example, the SAN may be an FC-SAN that uses an FC network and is implemented according to an FC protocol (FCP). In another example, the SAN may be an Internet protocol (IP)-SAN that uses a transmission control protocol (TCP)/IP network and is implemented according to Internet small computer system interface (iSCSI) over TCP/IP or Internet SCSI protocol. In another embodiment, the first network 400 may be a general network such as a TCP/IP network. For example, the first network 400 may be implemented according to a protocol such as a FC over Ethernet (FCoE), a network attached storage (NAS), non-volatile memory express (NVMe) over fabrics (NVMe-oF), or the like.

In an embodiment, the distributed storage system 10 may be an object storage for storing data in units called objects. However, the scope is not limited thereto, and the distributed storage system 10 may be a block storage or file storage.

In an embodiment, each of the first domain DI and the second domain D2 may be a data center. The data center is a facility that collects various data and provides services, and may also be referred to as a data storage center. The data center may be a system for search engines and data base management, and may be a computing system used in companies such as banks or government organizations.

A general distributed storage system may include a plurality of nodes, and the plurality of nodes may include a computing device and a storage device. That is, the general distributed storage system may be a structure in which the computing device and the storage device are converged. Thus, when fault (or an error) has occurred in one of the computing device and the storage device, the other one of the computing device and the storage device in which no fault has occurred, may not also used. For example, when fault has occurred in the computing device, the storage device may also be treated as a fault.

In the general distributed storage system, when fault has occurred, the computing device and the storage device are not disaggregated from each other, so that a topology change is required. In the general distributed storage system, when fault has occurred in one node, a recovery operation may be performed on the entire distributed storage system. That is, when fault has occurred in a specific node of the general distributed storage system, the recovery operation may be performed in the entire general distributed storage system or most nodes.

However, the distributed storage system 10 according to an embodiment may be a distributed storage system in which a plurality of computing nodes and a plurality of storage nodes are disaggregated from each other. The distributed storage system 10 may implement a distributed storage system disaggregated using NVMe-oF. Thus, when fault has occurred in one of the computing node and the storage node, the distributed storage system 10 may use the other one node in which no fault has occurred.

The distributed storage system 10 may manage a plurality of computing nodes and a plurality of storage nodes in consideration of the disaggregated environment. The distributed storage system 10 may perform an allocating operation and a recovery operation based on the disaggregated structure. When fault has occurred, the distributed storage system 10 may perform a recovery operation without a topology change. The distributed storage system 10 may use a second node in which a connection to a first node where fault has occurred, is established. The distributed storage system 10 may perform a recovery operation, thereby establishing a new connection between a third node and the second node of the same domain. In other words, the distributed storage system 10 does not require a recovery operation in the other most nodes, even if fault has occurred in one node.

In an embodiment, the distribution manager 100 may be connected to a plurality of computing nodes and a plurality of storage nodes. In an embodiment, the distribution manager 100 may be connected to the plurality of computing nodes via a first network 400. The distribution manager 100 may communicate with the plurality of computing nodes via the first network 400.

In an embodiment, the distribution manager 100 may perform an allocating operation. The allocating operation may indicate an operation of allocating (or selecting) a storage node in which data received from the client 300 are to be stored. In an embodiment, the distribution manager 100 may perform a recovery operation. The recovery operation may indicate an operation of processing a fault so as to continuously provide services to the client 300, when fault has occurred in one of the plurality of computing nodes and the plurality of storage nodes.

In an embodiment, the distribution manager 100 may generate and manage a first tree T1 and a second tree T2. The distribution manager 100 may manage the plurality of computing nodes and the plurality of storage nodes using the plurality of trees T1 and T2. The distribution manager 100 may perform an allocating operation based on the first tree T1 or the second tree T2. The distribution manager 100 may perform a recovery operation based on the first tree T1 or the second tree T2.

The domain may include the plurality of computing nodes and the plurality of storage nodes. In an embodiment, the domain may indicate a set of the plurality of computing nodes and the plurality of storage nodes connected via a network. For example, the domain may indicate a set of the plurality of computing nodes and the plurality of storage nodes connected via NVMe-oF.

Each of a plurality of computing nodes CN1, CN2, CN3, and CN4 may store data requested to be stored by a user or the client 300 in one of a plurality of storage nodes SN1, SN2, SN3, SN4, and SN5 via a network (e.g., first through third networks 210, 220, and 400). Also, each of the plurality of computing nodes CN1, CN2, CN3, and CN4 may obtain data requested to be read by the user or the client 300 from one of the plurality of storage nodes SN1, SN2, SN3, SN4, and SN5 via a network (e.g., the first through third networks 210, 220, and 400). For example, each of the plurality of computing nodes CN1, CN2, CN3, and CN4 may be implemented by a web server, a database management system (DBMS) or the like.

In an embodiment, the first domain D1 may include a first computing node CN1, a second computing node CN2, a first storage node SN1, a second storage node SN2, and a third storage node SN3. However, the scope is not limited thereto, and the number of computing nodes and the number of storage nodes included in the first domain D1 may be increased or decreased according to implementations.

The first computing node CN1, the second computing node CN2, the first storage node SN1, the second storage node SN2, and the third storage node SN3 may communicate with each other via the second network 210. In an embodiment, the second network 210 may be implemented according to a NVMe-oF protocol. That is, the first computing node CN1, the second computing node CN2, the first storage node SN1, the second storage node SN2, and the third storage node SN3 may communicate with each other through the NVMe-oF protocol.

In an embodiment, the second domain D2 may include a third computing node CN3, a fourth computing node CN4, a fourth storage node SN4, and a fifth storage node SN5. However, the scope is not limited thereto, and the number of computing nodes and the number of storage nodes included in the second domain D2 may be increased or decreased according to implementations.

The third computing node CN3, the fourth computing node CN4, the fourth storage node SN4, and the fifth storage node SN5 may communicate with each other via the third network 220. In an embodiment, the third network 220 may be implemented according to a NVMe-oF protocol. That is, the third computing node CN3, the fourth computing node CN4, the fourth storage node SN4, and the fifth storage node SN5 may communicate with each other through the NVMe-oF protocol.

In an embodiment, each of the plurality of computing nodes CN1, CN2, CN3, and CN4 may include arithmetic resources such as a central processing unit (CPU), and the like, Each of the plurality of computing nodes CN1, CN2, CN3, and CN4 may provide services in response to a request of the client 300. The plurality of computing nodes CN1, CN2, CN3, and CN4 may be located in physically different spaces. For example, each of the computing nodes CN1, CN2, CN3, and CN4 may be located in different server racks, and may be located in data centers located in different cities or countries.

In an embodiment, each of the plurality of computing nodes CN1, CN2, CN3, and CN4 may transmit commands to logically-connected (or allocated, connection-set) storage nodes, thereby programming or reading data. In this case, the data may be data that are error-corrected by an error correction code (ECC) engine. The data may be data bus inversion (DBI) or data masking (DM)-processed data, which may include cyclic redundancy code (CRC) information. The data may be data that are encoded for security or privacy.

In an embodiment, each of the plurality of storage nodes SN1, SN2, SN3, SN4, and SN5 may include storage resources such as solid state drive (SSD), hard disk driver (HDD), and the like. Each of the plurality of storage nodes SN1, SN2, SN3, SN4, and SN5 may store data used by the client 300. Each of the plurality of storage nodes SN1, SN2, SN3, SN4, and SN5 may be located in physically different spaces.

Each of the plurality of storage nodes SN1, SN2, SN3, SN4, and SN5 may be a storage device. Each of the plurality of storage nodes SN1, SN2, SN3, SN4, and SN5 may include an interface circuit, a controller, and a non-volatile memory. The interface circuit may be connected to a network (e.g., first and second networks 210 and 220). The interface circuit may communicate with each of the plurality of computing nodes through a network (e.g., the first and second networks 210 and 220). The interface circuit may be implemented to comply with standard protocols such as the NVMe-oF protocol. However, the scope is not limited thereto, and the interface circuit may be implemented using various interface methods such as advanced technology attachment (ATA), serial ATA (SATA), e-external SATA (e-SATA), a small computer small interface (SCSI, serial attached SCSI (SAS), peripheral component interconnection (PCI), PCI express (PCIe), NVM express (NVMe), IEEE 1394, a universal serial bus (USB), a secure digital (SD) card, a multi-media card (MMC), an embedded multi-media card (eMMC), a universal flash storage (UFS), an embedded universal flash storage (eUFS), and/or a compact flash (CF) card interface, and the like.

In an embodiment, each of the plurality of storage nodes SN1, SN2, SN3, SN4, and SN5 may transmit control signals and command/address signals to the non-volatile memory in response to read commands received from the plurality of computing nodes CN1, CN2, CN3, and CN4. Thus, when data is read from the non-volatile memory, read enable (RE) signals may be input to data output control signals and may serve to output data to a data (DQ) bus. Data strobe (DQS) may be generated using the RE signals. The commands and the address signals may be latched in a page buffer according to a rising edge or falling edge of write enable (WE) signals.

A controller may control an operation of a storage node entirely. In an embodiment, the controller may include a static random access memory (SRAM). The controller may write data into a non-volatile memory in response to write commands or may read the data from the non-volatile memory in response to read commands. For example, the write commands and/or the read commands may be provided from the computing nodes. The memory may temporarily store (may perform buffering) data to be written into the non-volatile memory or the data to be read from the non-volatile memory. Also, the memory may store meta data. Here, the meta data may be user data or data generated by the controller so as to manage the non-volatile memory. Each of the plurality of storage nodes may include a secure element (SE) for security or privacy.

In the first domain D1, the plurality of computing nodes CN1 and CN2 and the plurality of storage nodes SN1, SN2, and SN3 may be physically disaggregated from each other and may communicate with each other via the second network 210. Like in the first domain D1, in the second domain D2, the plurality of computing nodes CN3 and CN4 and the plurality of storage nodes SN4 and SN5 may be physically disaggregated from each other and may communicate with each other via the third network 220. That is, the distributed storage system 10 may be a distributed storage system in which a plurality of computing nodes and a plurality of storage nodes are disaggregated from each other.

As described above, in the distributed storage system 10 according to an embodiment, the plurality of computing nodes and the plurality of storage nodes may be connected to each other using NVMe-oF. In the distributed storage system 10, the plurality of computing nodes and the plurality of storage nodes may be disaggregated from each other using NVMe-oF. The disaggregated distributed storage system 10 may upgrade, replace or add the storage resources and the computing resources flexibly by disaggregating the computing nodes and the storage nodes from each other. The distributed storage system 10 may perform an allocating operation and a recovery operation based on the trees. The distributed storage system 10 may perform a recovery operation without a topology change. The distributed storage system 10 may recover a fault of the computing node or the storage node quickly.

Hereinafter, for convenience of explanation, the terms "computing node", "computing server", and "host server", and the like may be interchangeably used. Also, for convenience of explanation, the terms "storage node", "storage device" and the like may be interchangeably used. These terms may have the same meaning or different meanings according to the context of embodiments, and the meaning of each of the terms will be understood according to the context of embodiments to be described.

Figure 2:
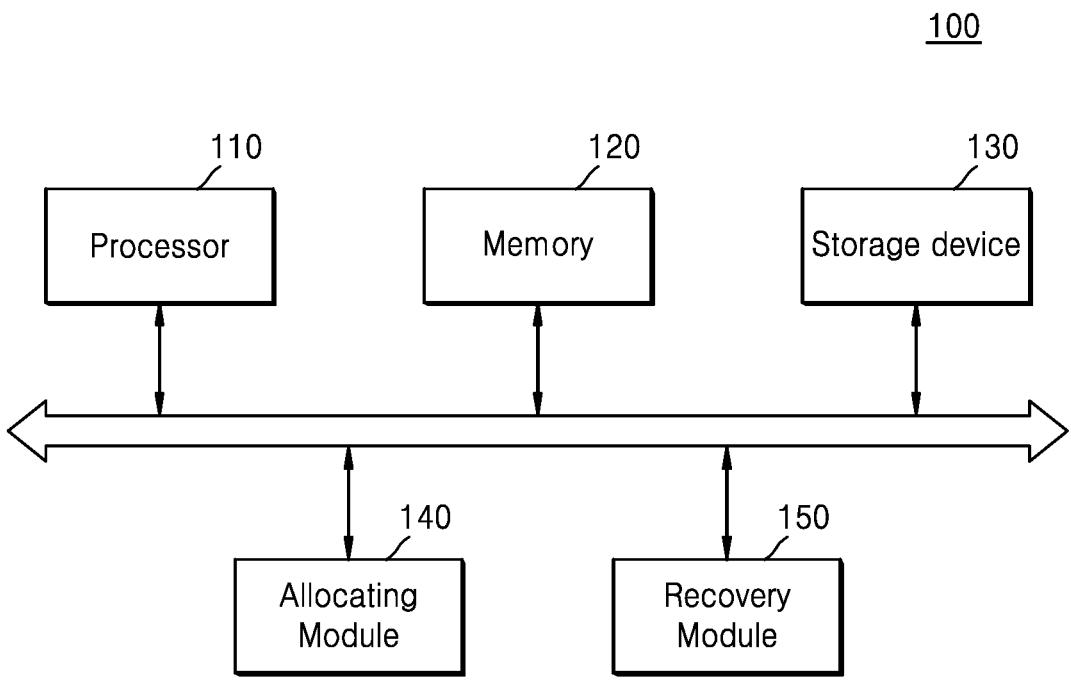
FIG. 2 is a block diagram illustrating a distribution manager of FIG. 1 in more detail.

FIG. 2 is a block diagram illustrating a distribution manager of FIG. 1 in more detail.

Referring to FIGS. 1 and 2, a distribution manager 100 may include a processor 110, a memory 120, a storage device 130, an allocating module 140, and a recovery module 150. The allocating module 140 and the recovery module 150 may be implemented with software configuration, hardware configuration or a combination thereof.

In an embodiment, the distribution manager 100 may be a computer and a server. The processor 110 may control the overall operation of the distribution manager 100, more specifically, operations of other elements that constitute the distribution manager 100. The processor 110 may perform instructions and/or data loaded into the memory 120. In an embodiment, the processor 110 may execute one or more instructions stored in the memory 120, thereby performing an allocating operation and a recovery operation. The processor 110 may be implemented as a general-purpose processor, a dedicated processor, an application processor, or the like.

The processor 110 may include one or more CPU cores. The processor 110 may include a single core processor or multiple core processors. The processor 110 may further include a controller for controlling the memory 120 and/or the storage device 130. According to embodiments, the processor 110 may further include an accelerator that is a dedicated circuit for a high-speed data operation such as an artificial intelligence (AI) data operation or the like.

The memory 120 may be used as a main memory device for the distribution manager 100. The memory 1200 may store one or more instructions. The memory 120 may include a non-volatile memory such as SRAM and/or DRAM, but may also include a flash memory or a non-volatile memory such as PRAM and/or RRAM. For example, the memory 120 may be double data rate synchronous (DRAM), high bandwidth memory (HBM), hybrid memory cube (HMC), dual in-line memory module (DIMM), Optane DIMM and/or non-Volatile DIMM (NVMDIMM). The memory 120 may also be implemented within the same package as the processor 110.

In an embodiment, the memory 120 may store data and parameters used in the allocating operation and the recovery operation. The memory 120 may store the first tree T1 and the second tree T2. The processor 110 may perform a recovery operation based on the first tree T1 or the second tree T2. More detailed descriptions of the first tree T1 and the second tree T2 will be described in more detail with reference to FIGS. 3A and 3B.

The storage device 130 may function as a non-volatile storage device for storing data regardless of the supply of power and may have a relatively large storage capacity compared to the memory 120. The storage device 130 may be a storage controller, and a non-volatile memory (NVM) for storing data under control of the storage controller. The non-volatile memory may include a flash memory having a 2-dimensional (2D) structure or 3-dimensional (3D) vertical NAND (V-NAND) structure, but may also include a different type of non-volatile memory such as PRAM and/or RRAM.

The storage device 130 may be included in the distribution manager 1000 in a state being physically disaggregated from the processor 110 and may also be implemented within the same package as the processor 110. Also, the storage device 130 may have a shape such as a solid state device (SSD) or a memory card to be detachably combined with other components of the distribution manager 100 via an interface. The storage device 130 may have a device to which standard protocols such as universal flash storage (UFS), embedded multi-media card (eMMC) or NVMe are applied, but embodiments are not limited thereto. According to embodiments, the distribution manager 100 may not include the storage device 130.

The allocating module 140 may perform an allocating operation for selecting a storage node in which the data received from the client 300 are to be stored. The allocating module 140 may store the replica of the data and the data in the storage node as much as a predetermined number. The allocating module 140 may store the replica of data in a different domain from a domain in which the data is stored. In this way, the data and the replica of the data may be stored in physically different positions. When a disaster occurs in the data center (i.e., when a storage node has a fault), an error may occur in the data stored in the storage node. However, the replica of the data is stored in the storage node of another domain so that the distributed storage system 10 may provide data to the client 300. Thus, the availability of the distributed storage system may be enhanced.

Hereinafter, it is assumed that the number of 'replicas' is 'one', but the scope is not limited thereto, and the number of replicas may be increased or decreased according to implementation. For example, the allocating module 140 may allocate the first storage node SN1 of a first domain D1 to the data. The allocating module 140 may select one of storage nodes included in the second domain D2 that is different from the first domain D1 with respect to the replica of the data. The allocating module 140 may allocate the fourth storage node SN4 to the replica of the data. The distribution manager 100 may access only the storage node SN1 in response to an access request about the data. When fault has occurred in the first storage node SN1, the distribution manager 100 may access the fourth storage node SN4 in response to the access request about the data.

The recovery module 150 may detect whether fault has occurred in one of the plurality of computing nodes and the plurality of storage nodes. The recovery module 150 may perform a recovery operation in response to the fault. The recovery module 150 may perform a recovery operation based on the first tree T1 or the second tree T2. When it is detected that fault has occurred in the first node, the recovery module 150 may perform a recovery operation so as to use a second node allocated to the first node. The recovery module 150 may allocate a third node of a domain in which the second node is included, to the second node based on the first tree T1 and the second tree T2. Thus, the distribution manager 100 may use the second node through the third node.

Here, the first node may indicate a failed node. The second node may indicate a node in which a connection to a failed node is established. Alternatively, the second node may indicate a node allocated to the failed node. The third node may be a node selected by replacing the first node in the same domain and may indicate a node in which a new connection to the second node is to be established.

In an embodiment, the recovery module 150 may perform a first recovery operation and a second recovery operation. The first recovery operation may indicate a recovery operation to be performed when fault has occurred in a computing node, and the second recovery operation may indicate a recovery operation to be performed when fault has occurred in the storage node.

Figure 3A:
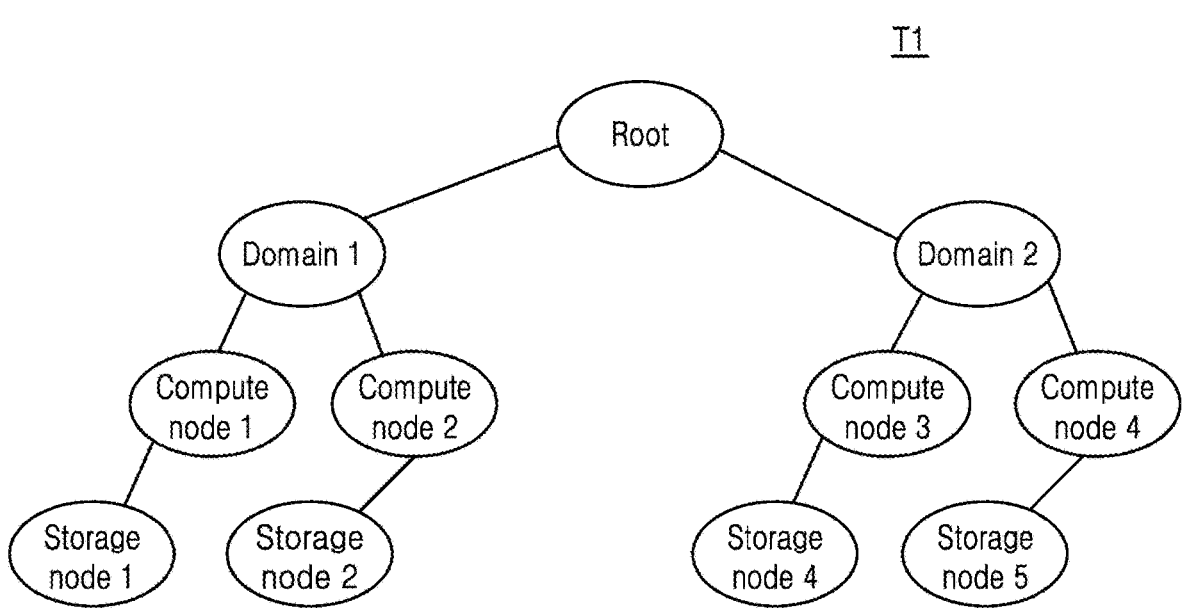
FIGS. 3A and 3B are diagrams illustrating an example of a first tree and an example of a second tree.
Figure 3B:
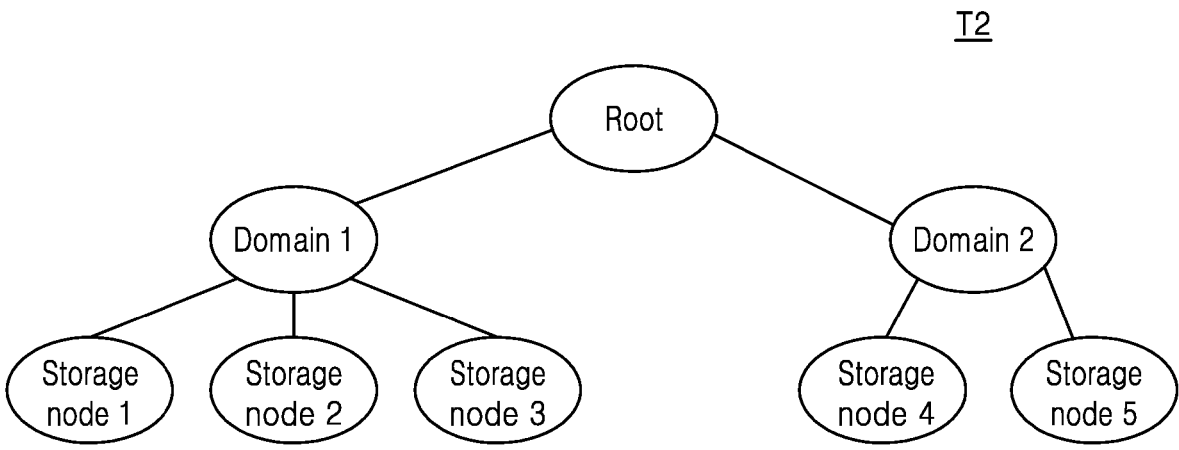

FIGS. 3A and 3B are diagrams illustrating an example of a first tree and an example of a second tree.

The first tree T1 will be described with reference to FIG. 3A, and the second tree T2 will be described with reference to FIG. 3B. The distributed storage system 10 may allocate resources in consideration of disaggregated environment. In an embodiment, the distributed storage system 10 may allocate and manage resources using trees. The distributed storage system 10 may perform an allocating operation and a recovery operation based on the first tree T1 and the second tree T2. For example, the first tree T1 and the second tree T2 may be b-trees.

Hereinafter, it is assumed that a connection between the first computing node CN1 and the first storage node SN1 is established, a connection between the second computing node CN2 and the second storage node SN2 is established, a connection between the third computing node CN3 and the fourth storage node SN4 is established and a connection between the fourth computing node CN4 and the fifth storage node SN5 is established. It is assumed that the third storage node SN3 is in a deactivated state.

Referring to FIGS. 1 and 3A, in the first tree T1, a root node that is the uppermost node may correspond to the distribution manager 100. The distributed storage system 10 may include a plurality of domains. The distributed storage system 10 may include a first domain D1 and a second domain D2. The plurality of domains D1 and D2 may be lower nodes of the root node. According to implementation, the plurality of domains D1 and D2 may be physically distributed. For example, the plurality of domains D1 and D2 may be located in data centers in different regions.

In an embodiment, the plurality of domains D1 and D2 may include a plurality of computing nodes and a plurality of storage nodes. The plurality of computing nodes may be lower nodes of a domain node. The plurality of storage nodes may be lower nodes of a computing node. Each of the plurality of storage nodes may be a leaf node of the first tree T1. The leaf node of the first tree T1 may have a weight. The weight may be determined based on a storage capacity of the corresponding storage node.

For example, in the first tree T1, the lower nodes of the root node may be a node of the first domain D1 and a node of the second domain D2. The lower nodes of the first node D1 may be a first computing node CN1 and a second computing node CN2. A lower node of the first computing node CN1 may be a first storage node SN1. A lower node of the second computing node CN2 may be a second storage node SN2. The lower nodes of the node of the second domain D2 may be a third computing node CN3 and a fourth computing node CN4. A lower node of the third computing node CN3 may be a fourth storage node SN4. A lower node of the fourth computing node CN4 may be a fifth storage node SN5.

The distribution manager 100 may generate and manage the first tree T1. The distribution manager 100 may change the first tree T1 during an operation. The first tree T1 may be static. The distribution manager 100 may perform a recovery operation to reallocate the third node to the second node in which a connection to the failed first node is established, and may update the first tree T1. The distribution manager 100 may remove a connection relationship between the first node and the second node and may add a connection relationship between the second node and the third node to the first tree T1.

The first tree T1 may be generated based on a logic connection state and a storage capacity. The distribution manager 100 may generate the first tree T1 based on a logic connection state between the plurality of computing nodes and the plurality of storage nodes and a storage capacity of the plurality of storage nodes. For example, the first tree T1 may be a network-capacity tree. The first tree T1 may be a tree considering a network (fault) domain and a storage capacity of the storage node. For example, the first tree T1 may be generated based on an established connection state between the computing node and the storage node. The first tree T1 may be mainly used in an allocating operation. The distribution manager 100 may select a storage node in which data is to be stored, based on the first tree T1.

In an embodiment, the distribution manager 100 may perform an allocating operation based on the first tree T1. The distribution manager 100 may store data and replicas of the data in another network domain based on the first tree T1. For example, the distributed administrator 100 may store a data source in the first storage node SN1 of the first domain D1 and may store a data replica in the fourth storage node SN4 of the second domain D2.

In an embodiment, the distribution manager 100 may set a weight of the leaf node in consideration of the storage capacity in the first tree T1. The storage capacity and the weight of the storage node may be proportional to each other. As the size of the storage capacity is increased, the weight may be increased. The distribution manager 100 may perform an allocating operation based on the weight of leaf nodes of the first tree T1. The distribution manager 100 may select a storage node having a large weight among the plurality of storage nodes so as to store data. The distribution manager 100 may allocate a node having a large weight to leaf nodes of the first tree T1 to new data.

Referring to FIGS. 1 and 3B, in the second tree T2, a root node that is the uppermost node may correspond to the distribution manager 100. The distributed storage system 10 may include a plurality of domains. The distributed storage system 10 may include a first domain D1 and a second domain D2. The plurality of domains D1 and D2 may be lower nodes of the root node. An example of a tree is a topology with a root node and two or more domains. The root may be an origin point of a network and, as mentioned above, correspond to the distribution manager 100. Each domain includes compute nodes and storage nodes. Examples of interconnections between nodes are shown in FIG. 3A.

In an embodiment, the plurality of storage nodes may be lower nodes of a domain node. Each of the plurality of storage nodes may be a leaf node of the second tree T2. The leaf node of the second tree T2 may have a weight. The weight may be determined based on a usage rate (or a CPU load) of a computing node in which a connection to the storage node is established. The leaf node of the second tree T2 may include information of the computing node in which a connection to the corresponding storage node is established. In an embodiment, each of the leaf nodes of the second tree T2 (i.e., each of the plurality of storage nodes) may have information about a state. The state of the storage nodes may indicate one of an activated state or a deactivated state. The activated state may indicate a state of a storage node logically connected to the computing node. The deactivated state may indicate a state of a storage node that is not logically connected to the computing node.

For example, in the second tree T2, the lower nodes of the root node may be a node of the first domain D1 and a node of the second domain D2. The lower node of the node of the first domain D1 may be a first storage node SN1, a second storage node SN2, and a third storage node SN3. The lower nodes of the node of the second domain D2 may be a fourth storage node SN4 and a fifth storage node SN5.

The distribution manager 100 may generate and manage the second tree T2. The second tree T2 may be static. The second tree T2 may be generated based on a logic connection state and a usage amount of the computing node. The distribution manager 100 may generate the second tree T2 based on a logic connection state between the plurality of computing nodes and the plurality of storage nodes and a usage rate of the computing node in which a connection to the plurality of storage nodes is established. For example, the second tree T2 may be generated based on a connection relationship between the computing node and the storage node connected to each other via NVMe-oF.

For example, the second tree T2 may be a storage-computing tree. The second tree T2 may be a tree considering a storage (fault) domain and a usage rate of the computing node. The second tree T2 may be mainly used in a recovery operation or a load-balanced operation. The distribution manager 100 may select a node to replace a failed node based on the second tree T2.

In an embodiment, the distribution manager 100 may set a weight of a leaf node in consideration of a usage rate (or load) of the computing node in which a connection to a corresponding storage node is established, in the second tree T2. The usage rate of the computing node and the weight may be inversely proportional to each other. As the usage rate of the computing node is increased, the weight may be decreased. The distribution manager 100 may set the state of each of the leaf nodes of the second tree T2. For example, the distribution manager 100 may set the state of the leaf node to an activated state when there is a computing node logically connected to a storage node corresponding to the leaf node of the second tree T2. The distribution manager 100 may set the state of the leaf node to a deactivated state when there is no computing node logically connected to a storage node corresponding to the leaf node of the second tree T2.

In an embodiment, the distribution manager 100 may perform a recovery operation based on the second tree T2. The distribution manager 100 may determine a fault domain based on the second tree T2. The distribution manager 100 may select a peer storage node based on the weight of the second tree T2 in a first recovery operation. In the first recovery operation, the distribution manager 100 may select a storage node having a large weight. In the first recovery operation, the distribution manager 100 may select a leaf node having a large weight so as to select a computing node having a small usage rate. In the first recovery operation, the distribution manager 100 may determine a third node based on information about the computing node stored in the leaf node.

In an embodiment, in a second recovery operation, the distribution manager 100 may select a third node based on the weight of the second tree T2. In the second recovery operation, the distribution manager 100 may select a leaf node having a small weight so as to select a deactivated storage node.

As described above, the distributed storage system 10 may perform an allocating operation and a recovery operation based on the first tree T1 and the second tree T2. Thus, the distribution manager 100 may manage the disaggregated computing nodes and storage nodes efficiently using NVMe-oF.

Figure 4:
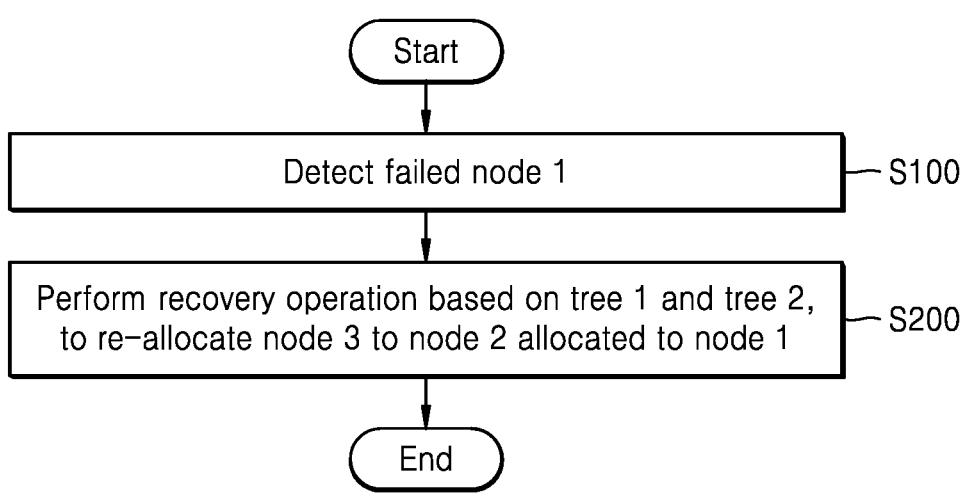
FIG. 4 is a flowchart illustrating an operating method of the distributed storage system of FIG. 1, according to an embodiment.

FIG. 4 is a flowchart illustrating an operating method of the distributed storage system of FIG. 1, according to an embodiment.

Referring to FIGS. 1 and 4, a distributed storage system 10 may perform a recovery operation. That is, the distribution manager 100 may perform a recovery operation based on the first tree T1 or the second tree T2. In operation S100, the distributed storage system 10 may detect a failed node. The distribution manager 100 may detect a first node in which failure has occurred. For example, the distribution manager 100 may detect that failure has occurred in a first node among a plurality of computing nodes and a plurality of storage nodes.

In operation S200, the distributed storage system 10 may perform a recovery operation based on the first tree T1 and the second tree T2 in response to failure. The distribution manager 100 may perform a recovery operation by re-allocating a third node to a second node allocated to the first node. The distribution manager 100 may use the second node in which a connection to the first node has been established, even if failure has occurred in the first node. The distribution manager 100 may establish a new connection between the third node and the second node of the same domain so as to use the second node that operates normally.

As described above, the distribution manager 100 may detect the occurrence of failure in the first node. The distribution manager 100 may perform a recovery operation by re-allocating the third node of the first domain to the second node allocated to the first node based on the first tree T1 and the second tree T2 in response to failure. Thus, the distribution manager 100 may recover failure immediately, and may not accompany a topology change.

Figure 5:
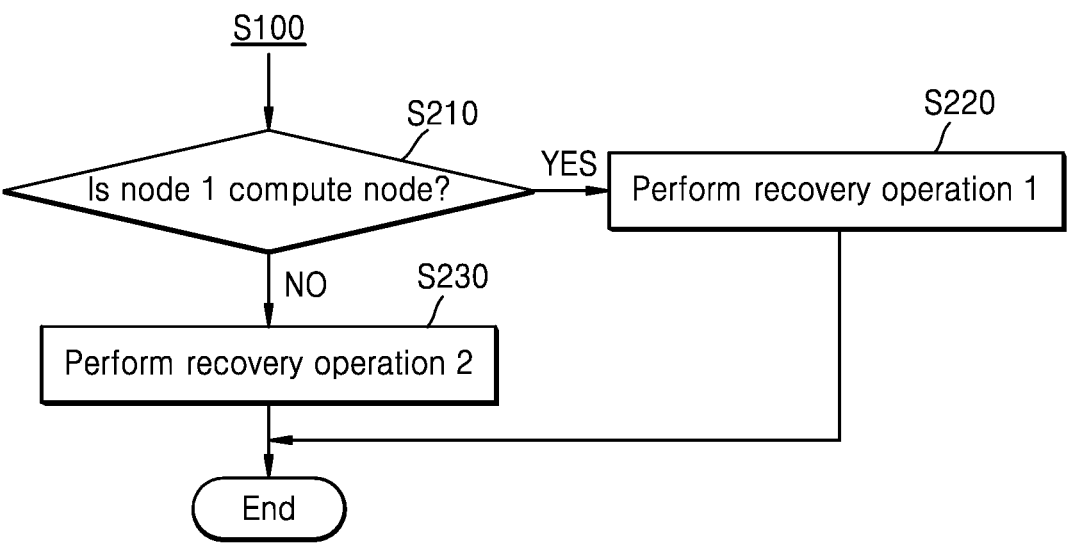
FIG. 5 is a flowchart illustrating operation S200 of FIG. 4 in more detail.

FIG. 5 is a flowchart illustrating operation S200 of FIG. 4 in more detail.

In an embodiment, the distributed storage system 10 may perform a recovery operation. The distributed storage system 10 may perform a first recovery operation and a second recovery operation. Referring to FIGS. 1, 4, and 5, operation S200 of FIG. 4 may include operations S210 through S230. In operation S210, the distributed storage system 10 may determine whether the first node is a computing node. The distribution manager 100 may determine whether the first node in which failure has occurred, is a computing node or storage node. When the first node is a computing node, the distributed storage system 10 may perform operation S220, and when the first node is a storage node, the distributed storage system 10 may perform operation S230.

In operation S220, the distributed storage system 10 may perform a first recovery operation. The distributed storage system 10 may re-allocate a second computing node of the same domain to a first storage node, so as to use a first storage node allocated to the first computing node, because failure has occurred in the first computing node. The distributed storage system 10 may use the first storage node using the second computing node by replacing the first computing node in which failure has occurred.

In operation S230, the distributed storage system 10 may perform a second recovery operation. The distributed storage system 10 may re-allocate a third storage node of the same domain to a first computing node, so as to use the first computing node allocated to the first storage node, because failure has occurred in the first storage node. The distributed storage system 10 may use the first computing node using the third storage node by replacing the first storage node in which failure has occurred.

As described above, the distribution manager 100 may perform a first recovery operation when the first node is a computing node. The distribution manager 100 may perform a second recovery operation when the first node is a storage node.

Figure 6:
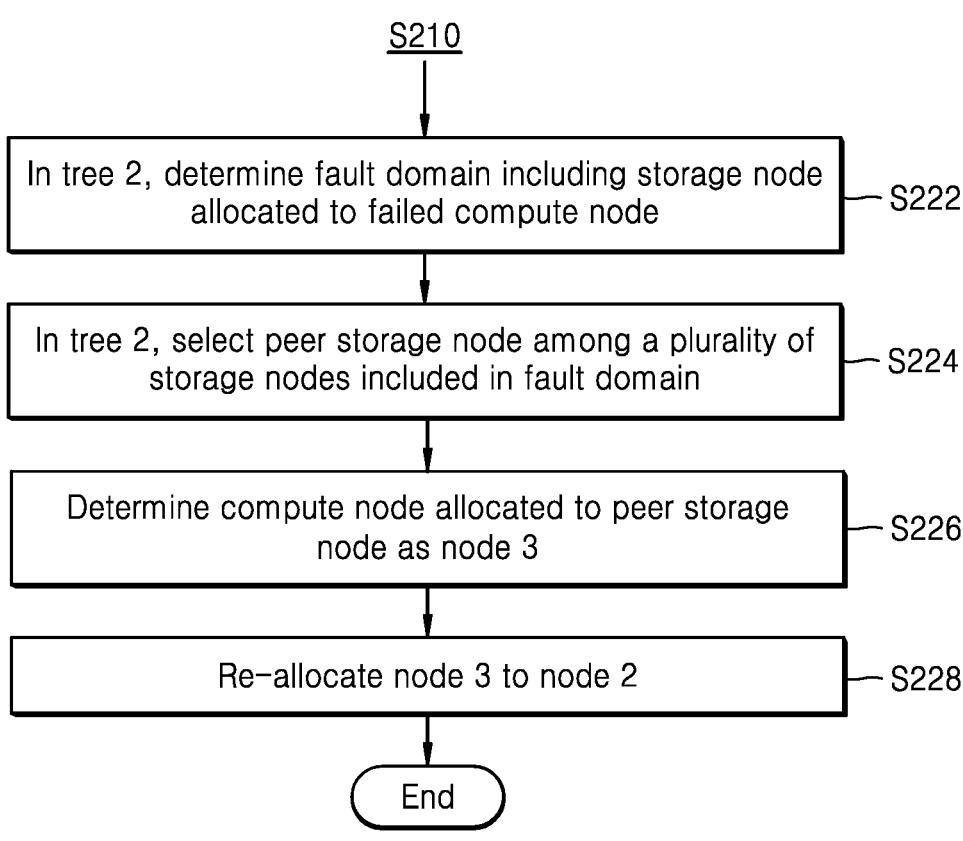
FIG. 6 is a flowchart illustrating operation S220 of FIG. 5 in more detail.
Figure 7A:
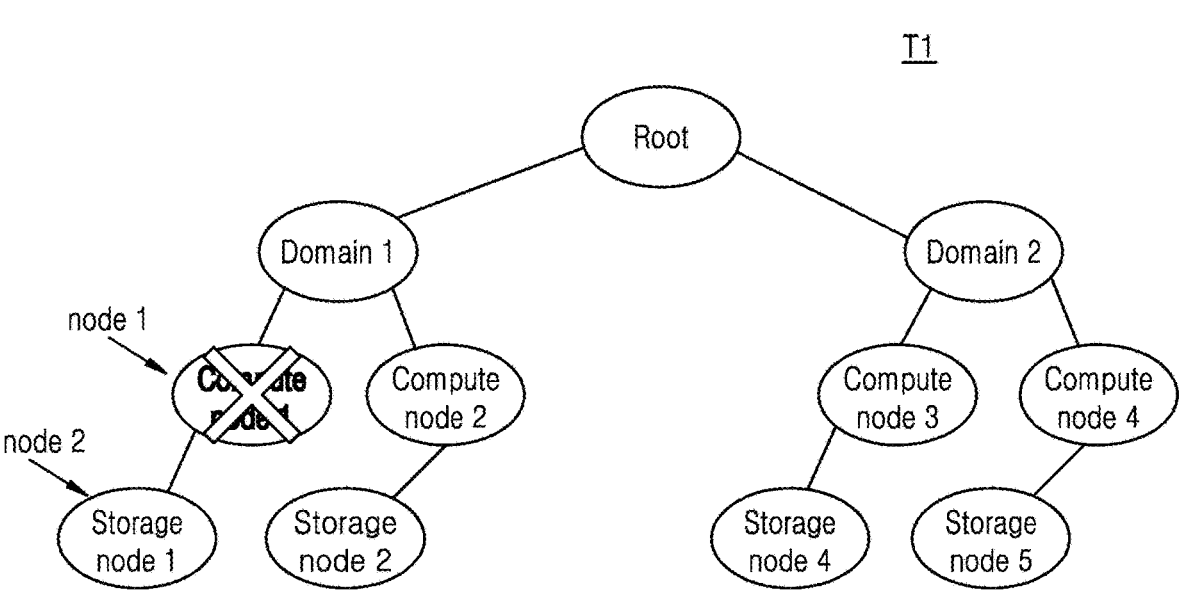
FIGS. 7A through 7C are diagrams for describing a first recovery operation.
Figure 7B:
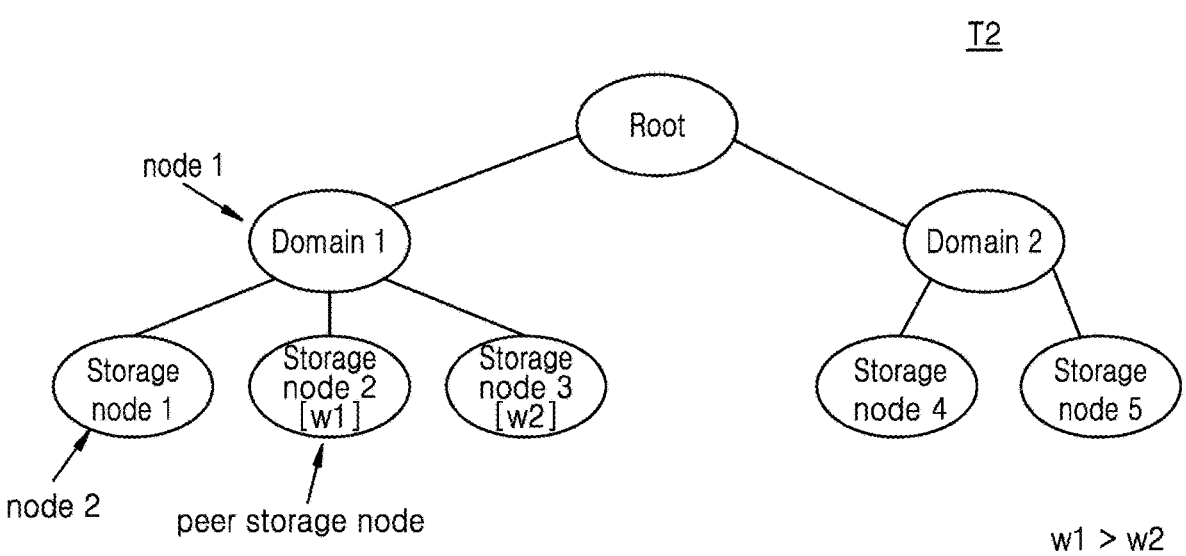
Figure 7C:
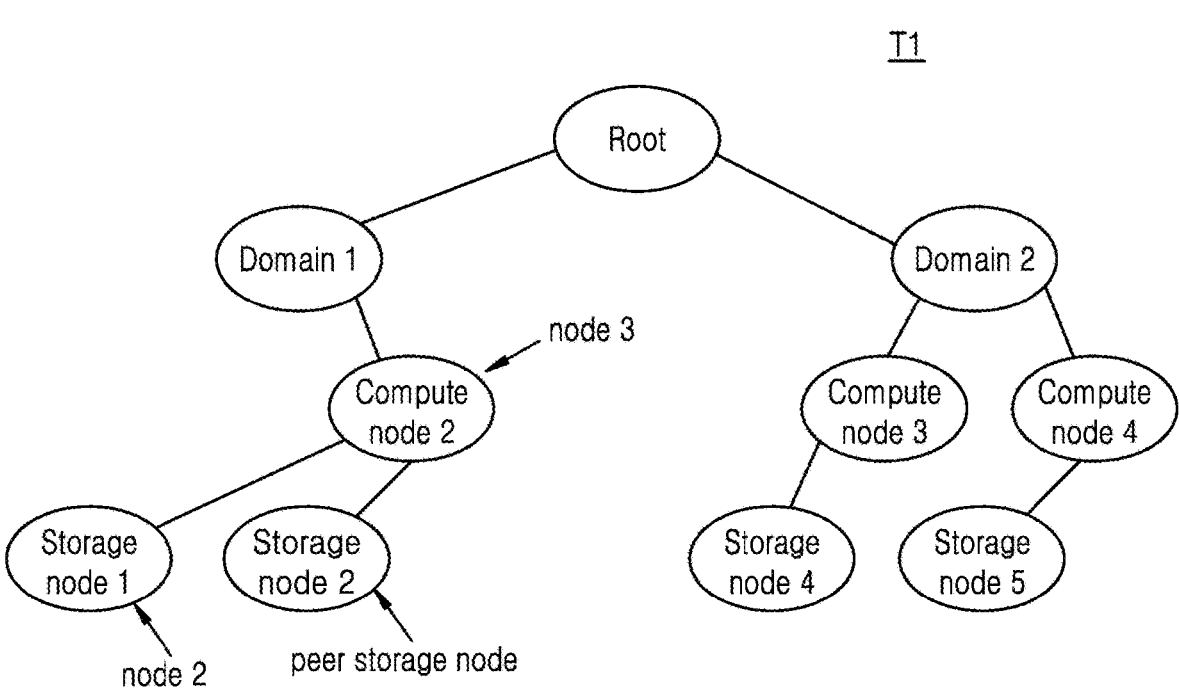

FIG. 6 is a flowchart illustrating operation S220 of FIG. 5 in more detail. FIGS. 7A through 7C are diagrams for describing a first recovery operation. FIG. 7A illustrates a first tree T1 before the first recovery operation, FIG. 7B illustrates a second tree T2, and FIG. 7C illustrates the first tree T1 after the first recovery operation.

The first recovery operation will be described with reference to FIG. 6. It is assumed that failure has occurred in a first computing node CN1. Thus, the first node may be the first computing node CN1, and the second node may be a first storage node SN1. FIG. 7A is the same as or similar to FIG. 3A and thus, detailed descriptions thereof will be omitted. FIG. 7B is the same as or similar to FIG. 3B and thus, detailed descriptions thereof will be omitted. In the second tree T2, the first storage node SN1 is a second node and thus, the first domain may be a fault domain. In the second tree T2, it is assumed that the second storage node SN2 has a first weight w1 and the third storage node SN3 has a second weight w2. It is assumed that the first weight w1 is greater than the second weight w2. However, the scope is not limited thereto. Through the first recovery operation, the distribution manager 100 may select the second storage node SN2 as a peer storage node in the second tree T2.

FIG. 7C illustrates an updated first tree T1 after the first recovery operation is completed. An uppermost node of the first tree T1 may be a root node, and the root node may correspond to the distribution manager 100. A child node of the root node may be a node of the first domain D1 and a node of the second domain D2. A child node of the node of the first domain D1 may be the second computing node CN2. The first computing node CN1 may be deleted from the first tree T1, because the first computing node CN1 is not used due to failure. A child node of the node of the second computing node CN2 may be the first storage node SN1 and the second storage node SN2. The child node of the node of the second domain D2 may be a third computing node CN3 and a fourth computing node CN4. A child node of the third computing node CN3 may be a fourth storage node SN4, and a child node of the fourth computing node CN4 may be a fifth storage node SN5. The second node may be the first storage node SN1, and the third node may be the second computing node CN2, and the peer storage node may be the second storage node SN2.

Referring to FIGS. 1, 5, 6, 7A through 7C, operation S220 of FIG. 5 may include operations S222 through S228. In operation S222, the distributed storage system 10 may determine a fault domain including a previously-allocated storage node to a computing node in which failure has occurred. For example, the distribution manager 100 may determine the first computing node CN1 that is the first node in which failure has occurred, in the first tree T1. The distribution manager 100 may determine the first storage node SN1 that is a child node of the first computing node CN1 as a second node in the first tree T1. The distribution manager 100 may determine the first storage node SN1 in which a connection to the first computing node CN1 is established.

The distribution manager 100 may determine a parent node of the first storage node SN1 as a fault domain in the second tree T2. The distribution manager 100 may determine the first domain D1 as a fault domain, because the parent node of the first storage node SN1 is the first domain D1. That is, the distribution manager 100 may determine the first domain D1 in which the first storage node SN1 is included. The distribution manager 100 may determine a domain of the first storage node SN1, so as to establish a connection between a new computing node (i.e., the second computing node CN2) selected in the same domain and the first storage node SN1. As an example, a fault domain may refer to a set of nodes that share a single point of failure.

In operation S224, the distributed storage system 10 may select a peer storage node among a plurality of storage nodes included in the fault domain. The distribution manager 100 may select one of child nodes of the first domain D1 as a peer storage node in the second tree T2. The distribution manager 100 may select one of storage nodes included in the first domain D1 as a peer storage node. Here, the distribution manager 100 may exclude the second node when selecting the storage node. That is, the distribution manager 100 may exclude the first storage node SN1 as a second node and may select one of the second storage node SN2 and the third storage node SN3 as a peer storage node. For example, the distribution manager 100 may select the second storage node SN2 as a peer storage node.

In an embodiment, the distribution manager 100 may select a third node in consideration of balance of the entire system. The distribution manager 100 may select an optimum third node based on a current state. When connecting a plurality of storage nodes to a specific computing node, the distribution manager 100 may cause unbalance of the system. In order to prevent the unbalance of the system, the distribution manager 100 may select an optimum third node in consideration of parameters of the computing node and parameters of the storage node, and the like. Specifically, the distribution manager 100 may select an optimum third node based on a usage rate of the computing node.

In an embodiment, the distribution manager 100 may select a storage node having a greatest weight among storage nodes included in the fault domain, as a peer storage node. The weight may indicate a usage rate or load of the computing node allocated to the storage node. The weight may be inversely proportional to the usage rate of the computing node. As the usage rate of the computing node is decreased, the weight may be decreased.

For example, in the second tree T2, the distribution manager 100 may select a storage node having a greatest weight among a plurality of storage nodes (e.g., the second storage node SN2 and the third storage node SN3) included in the first domain D1. The distribution manager 100 may select the second storage node SN2 as a peer storage node, because the first weight w1 is greater than the second weight w2. The usage rate of the second computing node CN2 allocated to the second storage node SN2 may be low, because the weight of the second storage node SN2 is large. The distribution manager 100 may prevent unbalance by allocating the computing node having a low usage rate to the first storage node SN1. That is, the distribution manager 100 may select a computing node based on the usage rate of the computing node, and may allocate the selected computing node to the first storage node SN1. Thus, the distribution manager 100 may prevent the usage rate or load of a specific computing node from being rapidly increased due to the recovery operation.

In operation S226, the distributed storage system 10 may determine a computing node allocated to the peer storage node as a third node. The distribution manager 100 may determine the second computing node CN2 allocated to the second storage node SN2 as a third node, because the second storage node SN2 is a peer storage node. The distribution manager 100 may determine the second computing node CN2 by checking a parent node of the second storage node SN2 in the first tree T1. Alternatively, the leaf node of the second tree T2 may include a weight and information about the computing node corresponding to the storage node. The distribution manager 100 may determine the second computing node CN2 based on information about the computing node included in the leaf node of the second tree T2.

In operation S228, the distributed storage system 10 may re-allocate the third node to the second node. The distribution manager 100 may re-allocate the second computing node CN2 to the first storage node SN1. The distribution manager 100 may allocate the second computing node CN2 to the first storage node SN1 instead of the first computing node CN1 in which failure has occurred, so as to use the first storage node SN1. The distribution manager 100 may select a computing node to replace the first computing node CN1 in the same domain and thus may complete the recovery operation without a topology change.

In an embodiment, the case where first data is stored in the first storage node SN1, is assumed. The first computing node CN1 may process the first data. When failure has occurred in the first computing node CN1, a new connection between the first storage node SN1 in which the first data is stored, and the second computing node CN2 of the same domain connected via NVMe-OF may be established. That is, after the recovery operation is completed, the second computing node CN2 may process an access request to the first data. In this way, the distributed storage system 10 according to an embodiment may perform a recovery operation without a topology change.

Figure 8:
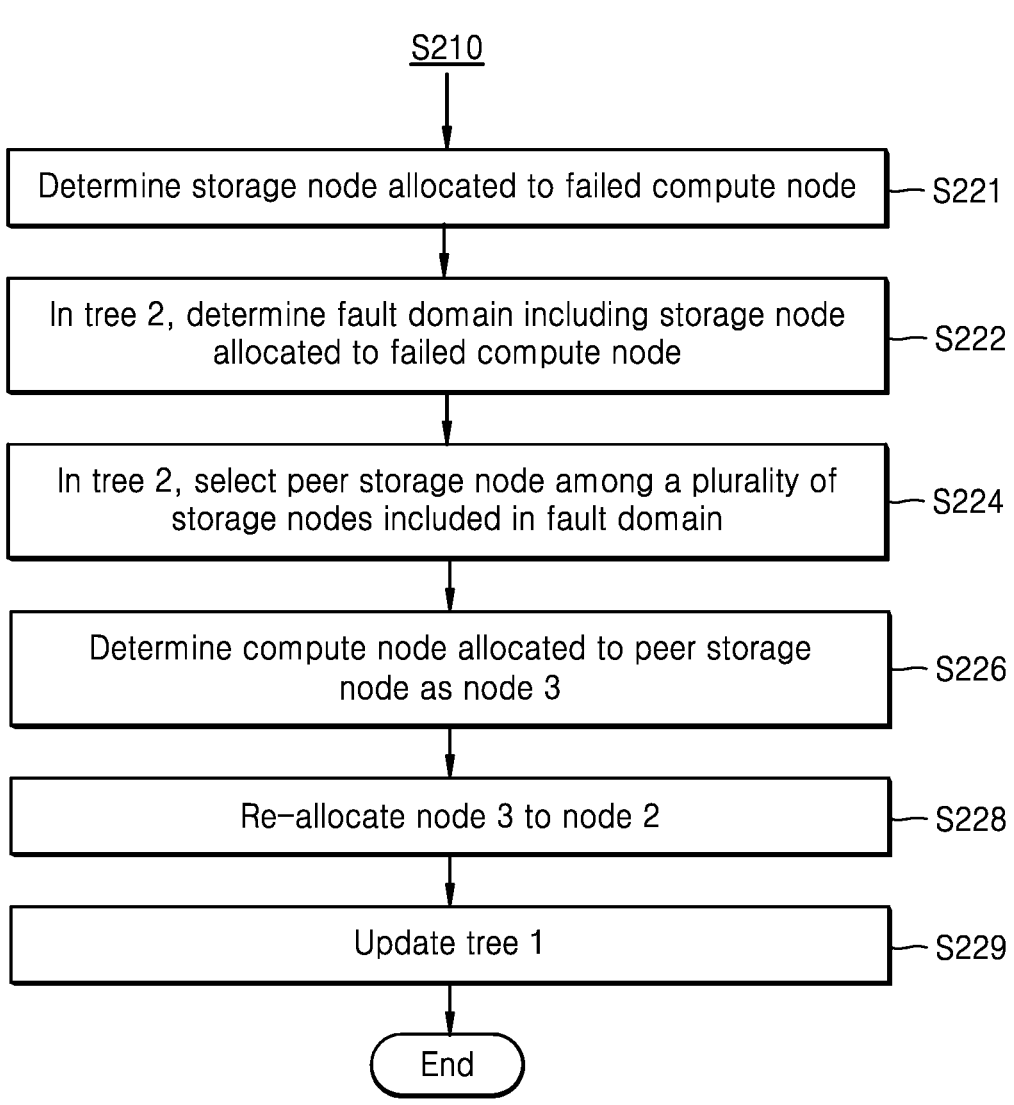
FIG. 8 is a flowchart illustrating operation S220 of FIG. 5 in more detail.

FIG. 8 is a flowchart illustrating operation S220 of FIG. 5 in more detail.

Referring to FIGS. 1, 5, 6, and 8, operation S220 of FIG. 5 may include operations S221 through S229. In operation S221, the distributed storage system 10 may determine a storage node allocated to a computing node in which failure has occurred. The distribution manager 100 may determine a child node of the computing node in which failure has occurred, in the first tree T1. For example, the distribution manager 100 may detect that failure has occurred in the first computing node CN1. The distribution manager 100 may determine the first storage node SN1 that is a child node of the first computing node CN1 as a storage node allocated to the first computing node CN1.

Operations S222 to S228 have been described in FIG. 6 and thus, detailed descriptions thereof will be omitted. In operation S229, the distributed storage system 10 may update the first tree T1. Correction of the first tree T1 generated based on a network connection relationship between a computing node and a storage node is required, because the distribution manager 100 has re-allocated a third node to a second node. The distribution manager 100 may remove a connection relationship between the first node and the second node, and may add a connection relationship between the second node and the third node to the first tree T1. For example, the distribution manager 100 may remove the connection relationship between the first computing node CN1 in which failure has occurred, and the first storage node SN1, and may add a connection relationship between the newly-allocated second computing node CN2 and the first storage node SN1 to the first tree T1.

Referring to FIG. 7C, a lower node of the node of the first domain D1 may be the second computing node CN2. A child pointer of the node of the first domain D1 indicating the first computing node CN1 may be initialized. A parent pointer of the first storage node SN1 may indicate the second computing node CN2. Each of child pointers of the second computing node CN2 may indicate the first storage node SN1 and the second storage node SN2.

In an embodiment, the distributed storage system 10 may update the first tree T1. The distributed storage system 10 may initialize the child pointer of the fault domain indicating a first node in the first tree T1. For example, the distribution manager 100 may initialize the child pointer of the node of the first domain D1 that has indicated the first computing node CN1 in the first tree T1. The distributed storage system 10 may update the child pointer of the third node to indicate a second node in the first tree T1. For example, the distribution manager 100 may update the child pointer of the second computing node CN2 to indicate as the first storage node SN1. The distributed storage system 10 may update the parent pointer of the second node to indicate a third node in the first tree T1. For example, the distribution manager 100 may update the parent pointer of the first storage node SN1 to indicate the second computing node CN2 in the first tree T1.

Figure 9:
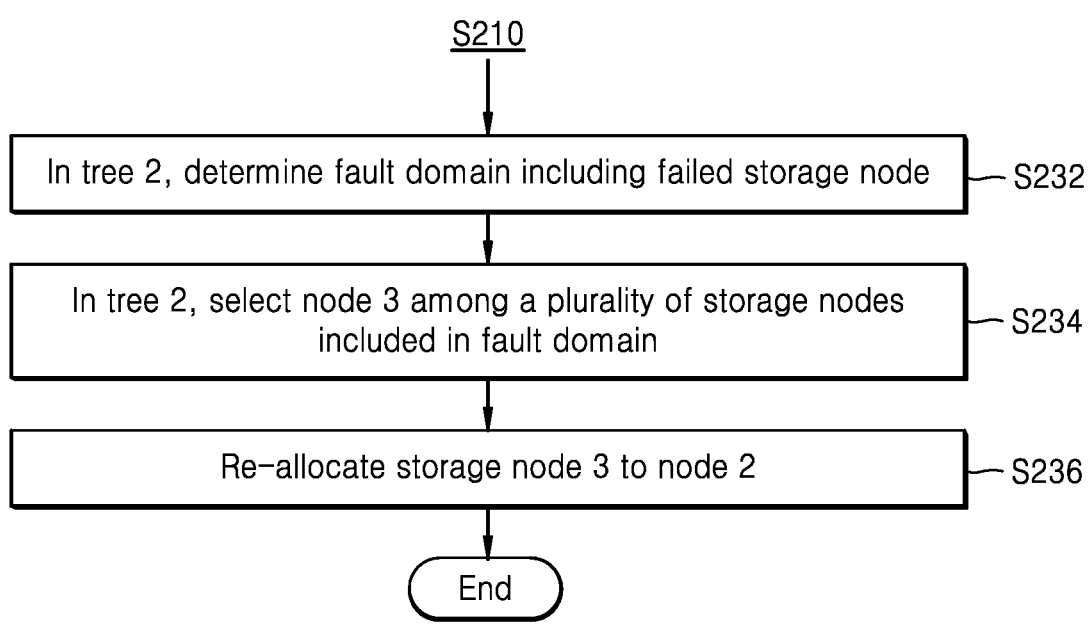
FIG. 9 is a flowchart illustrating operation S230 of FIG. 5 in more detail.
Figure 10A:
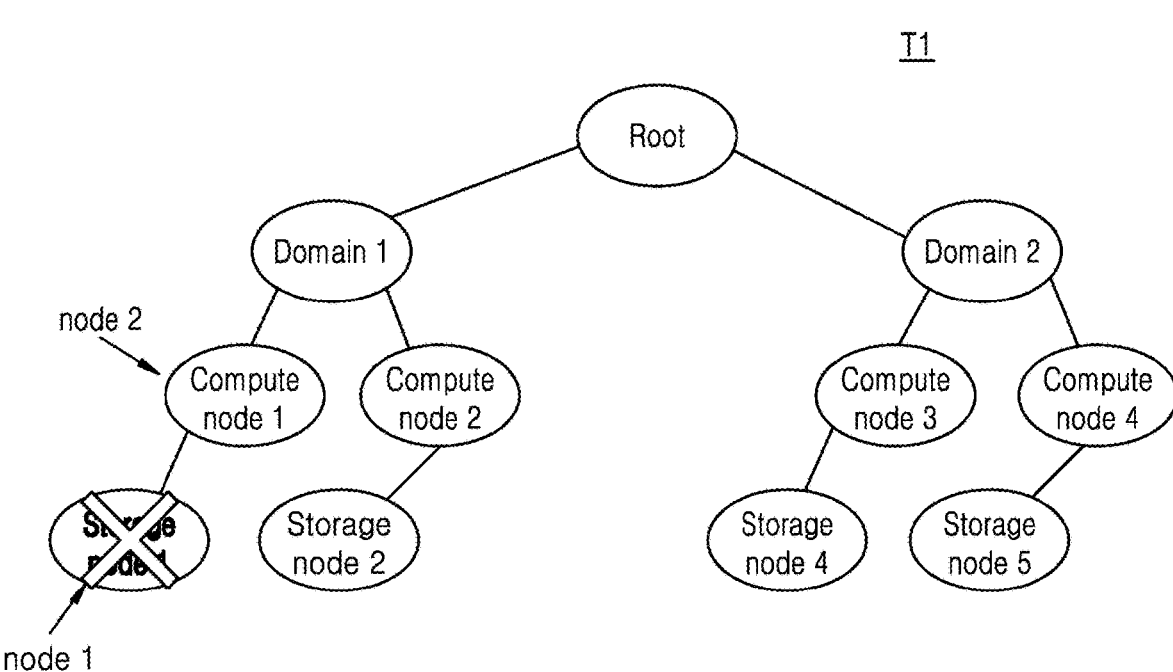
FIGS. 10A through 10C are diagrams for describing a second recovery operation.
Figure 10B:
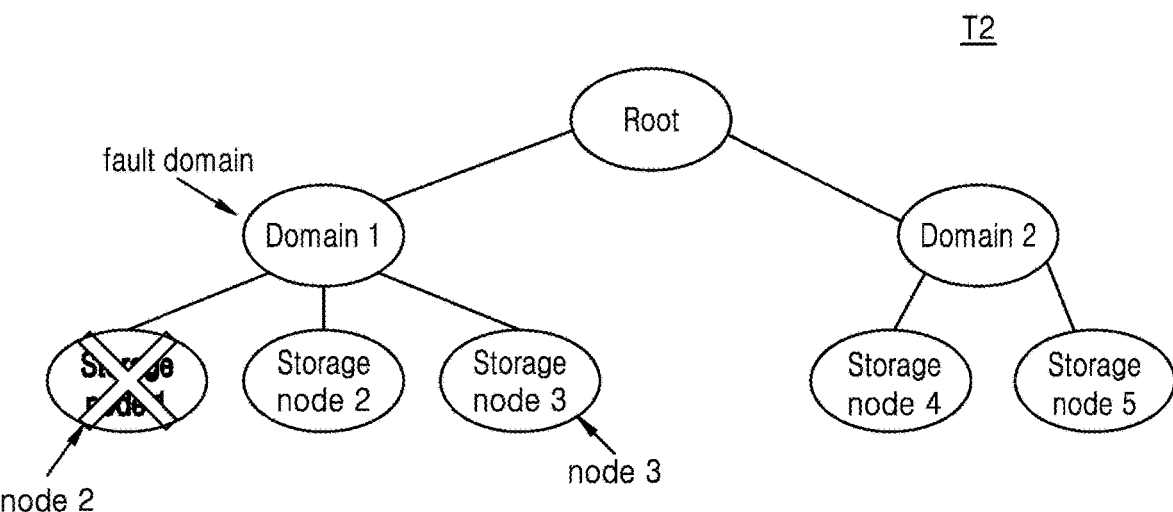
Figure 10C:
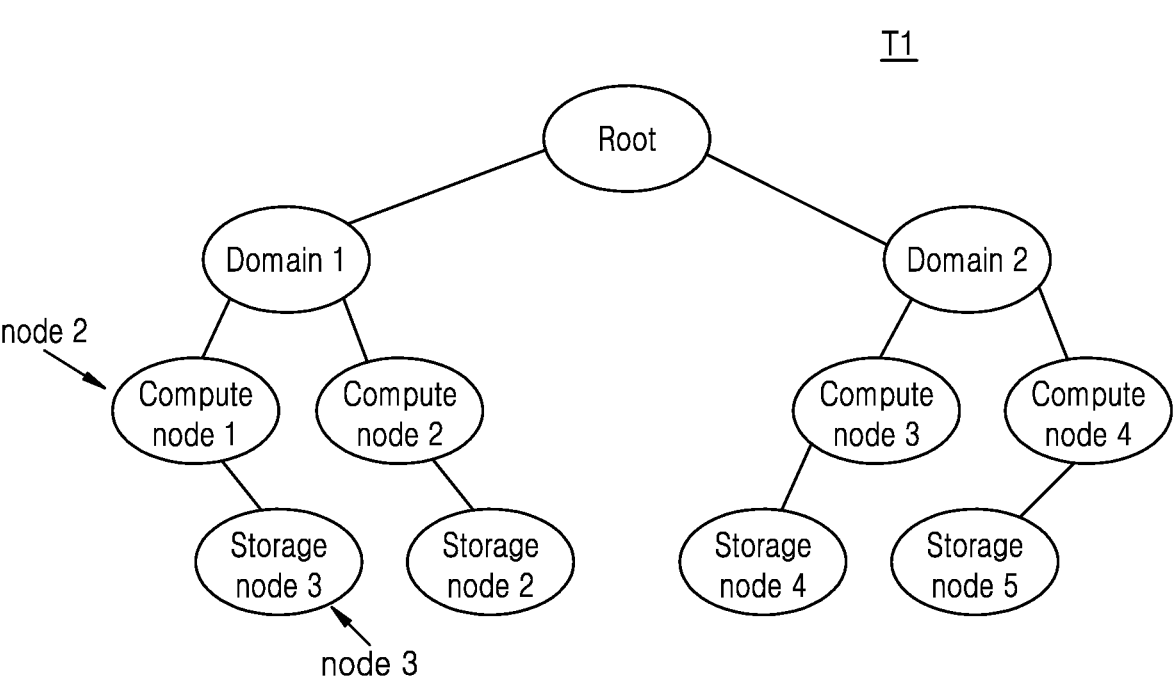

FIG. 9 is a flowchart illustrating operation S230 of FIG. 5 in more detail. FIGS. 10A through 10C are diagrams for describing a second recovery operation. FIG. 10A illustrates a first tree T1 before the second recovery operation, FIG. 10B illustrates a second tree T2, and FIG. 10C illustrates the first tree T1 after the second recovery operation.

The second recovery operation will be described with reference to FIG. 9. It is assumed that failure has occurred in a first storage node SN1. Thus, the first node may be the first storage SN1, and the second node may be a first computing node CN1. FIG. 10A is the same as or similar to FIG. 3A and thus, detailed descriptions thereof will be omitted. FIG. 10B is the same as or similar to FIG. 3B and thus, detailed descriptions thereof will be omitted. In the second tree T2, the first storage node SN1 is a first node and thus, the first domain D1 may be a fault domain. In the second tree T2, it is assumed that the second storage node SN2 has a first weight w1 and the third storage node SN3 has a second weight w2. It is assumed that the first weight w1 is greater than the second weight w2. However, the scope is not limited thereto. Through the second recovery operation, the distribution manager 100 may select the third storage node SN3 as a third node in the second tree T2.

FIG. 10C illustrates an updated first tree T1 after the second recovery operation is completed. An uppermost node of the first tree T1 may be a root node, and the root node may correspond to the distribution manager 100. A child node of the root node may be a node of the first domain D1 and a node of the second domain D2. The child node of the node of the first domain D1 may be a first computing node CN1 and a second computing node CN2. A child node of the first computing node CN1 may be a third storage node SN3. The first storage node SN1 may be deleted from the first tree T1, because the first storage node SN1 is not used due to failure. A child node of the second computing node CN2 may be a second storage node SN2. The child node of the node of the second domain D2 may be a third computing node CN3 and a fourth computing node CN4. A child node of the third computing node CN3 may be a fourth storage node SN4, and a child node of the fourth computing node CN4 may be a fifth storage node SN5. The second node may be the first computing node CN1, and the third node may be the third storage node SN3.

Referring to FIGS. 1, 5, 9, 10A through 10C, operation S230 of FIG. 5 may include operations S232 through S236. In operation S232, the distributed storage system 10 may determine a fault domain including a failed storage node. The distribution manager 100 may determine the first storge node SN1 that is the first node in which failure has occurred, in the first tree T1 of FIG. 10A. The distribution manager 100 may determine a parent node of the first storage node SN1 as a fault domain in the second tree T2. The distribution manager 100 may determine the first domain D1 as a fault domain, because the parent node of the first storage node SN1 is the first domain D1. That is, the distribution manager 100 may determine the first domain D1 in which the first storage node SN1 is included. The distribution manager 100 may determine a domain of the first storage node SN1, so as to establish a connection between a new storage node (i.e., the third storage node SN3) selected in the same domain and the first storage node SN1.

In operation S234, the distributed storage system 10 may select a third node among a plurality of storage nodes included in the fault domain. The distribution manager 100 may select one of child nodes of the node of the first domain D1 as a third node in the second tree T2. The distribution manager 100 may select one of storage nodes included in the first domain D1 as a third node. Here, the distribution manager 100 may exclude the first node when selecting the storage node. That is, the distribution manager 100 may exclude the first storage node SN1 as a first node, and may select one of the second storage node SN2 and the third storage node SN3 as a third node. For example, the distribution manager 100 may select the third storage node SN3 as a third node.

In an embodiment, the distribution manager 100 may select a deactivated storage node among storage nodes included in the fault domain, as a third node. That is, the distribution manager 100 may select a deactivated storage node that is not logically connected to the computing node, as a third node, thereby re-allocating the selected third node to the second node.

In an embodiment, the distribution manager 100 may select a third node based on the state of the storage node. For example, the state of the storage nodes may indicate one of an activated state and a deactivated state. The activated state may indicate a state in which the storage node is logically connected to the computing node, and the deactivated state may indicate a state in which the storage node is not logically connected to the computing node. The distribution manager 100 may select a storage node having a deactivated state among the storage nodes as a third node.

For example, in the second tree T2, the distribution manager 100 may select a storage node having a deactivated state among a plurality of storage nodes (e.g., the second storage node SN2 and the third storage node SN3) included in the first domain D1. It is assumed that the state of the second storage node SN2 indicates an activated state and the state of the third storage node SN3 indicates a deactivated state. The distribution manager 100 may select the third storage node SN3 as a third node, because the state of the third storage node SN3 is in a deactivated state. The third storage node SN3 may be allocated to the first computing node CN1 that is a second node, because the third storage node SN3 is a deactivated storage node.

In operation S236, the distributed storage system 10 may re-allocate the third node to the second node. The distribution manager 100 may re-allocate the third storage node SN3 to the first computing node CN1. The distribution manager 100 may allocate the third storage node SN3 to the first computing node CN1 instead of the first storage node SN1 in which failure has occurred, so as to use the first computing node CN1. The distribution manager 100 may complete the recovery operation without a topology change, because the distribution manager 100 selects a storage node to replace the first storage node SN1 in the same domain.

The distribution manager 100 may update the first tree T1 after re-allocating the third node to the second node, like in the first recovery operation. Correction of the first tree T1 generated based on a network connection relationship between a computing node and a storage node is required, because the distribution manager 100 re-allocates the third node to the second node. The distribution manager 100 may remove a connection relationship between the first node and the second node, and may add a connection relationship between the second node and the third node to the first tree T1. For example, the distribution manager 100 may remove the connection relationship between the first storage node SN1 in which failure has occurred and the first computing node CN1, and may add a connection relationship between the newly-allocated first computing node CN1 and the third storage node SN3 to the first tree T1.

In an embodiment, the distributed storage system 10 may update the first tree T1. The distributed storage system 10 may update the child pointer of the second node to indicate the third node in the first tree T1. That is, the distributed storage system 10 may delete a storage node in which an error has occurred, from the first tree T1. For example, the distribution manager 100 may delete the first storage node SN1 in which failure has occurred, from the first tree T1. The distribution manager 100 may update the child pointer of the first computing node CN1 that is the second node to indicate the third storage node SN3 that is the third node, in the first tree T1. The distribution manager 100 may update the parent pointer of the third node to indicate the second node. For example, the distribution manager 100 may update the parent pointer of the third storage node SN3 to indicate the first computing node CN1.

As described above, the distributed storage system 10 may perform a recovery operation using two b-trees. The distribution manager 100 may perform a recovery operation based on the weight of leaf nodes of the second tree T2. The distributed storage system 10 may select a storage node having a large weight among a plurality of storage nodes, so as to allocate a computing node having a small usage rate to a storage node that is the second node in the first recovery operation. The distributed storage system 10 may select a storage node having a small weight among the plurality of storage nodes, so as to allocate a deactivated storage node to a computing node that is the second node in the second recovery operation.

Thus, the distributed storage system 10 may perform a recovery operation without a topology change. The distributed storage system 10 may immediately perform the recovery operation even if failure has occurred. The distributed storage system 10 may maintain current topology while performing a recovery operation. The distributed storage system 10 may not require a load-balancing operation between the entire nodes or the entire domains while performing the recovery operation. The distributed storage system 10 may serve an input/output request by re-distributing resources efficiently.

Figure 11:
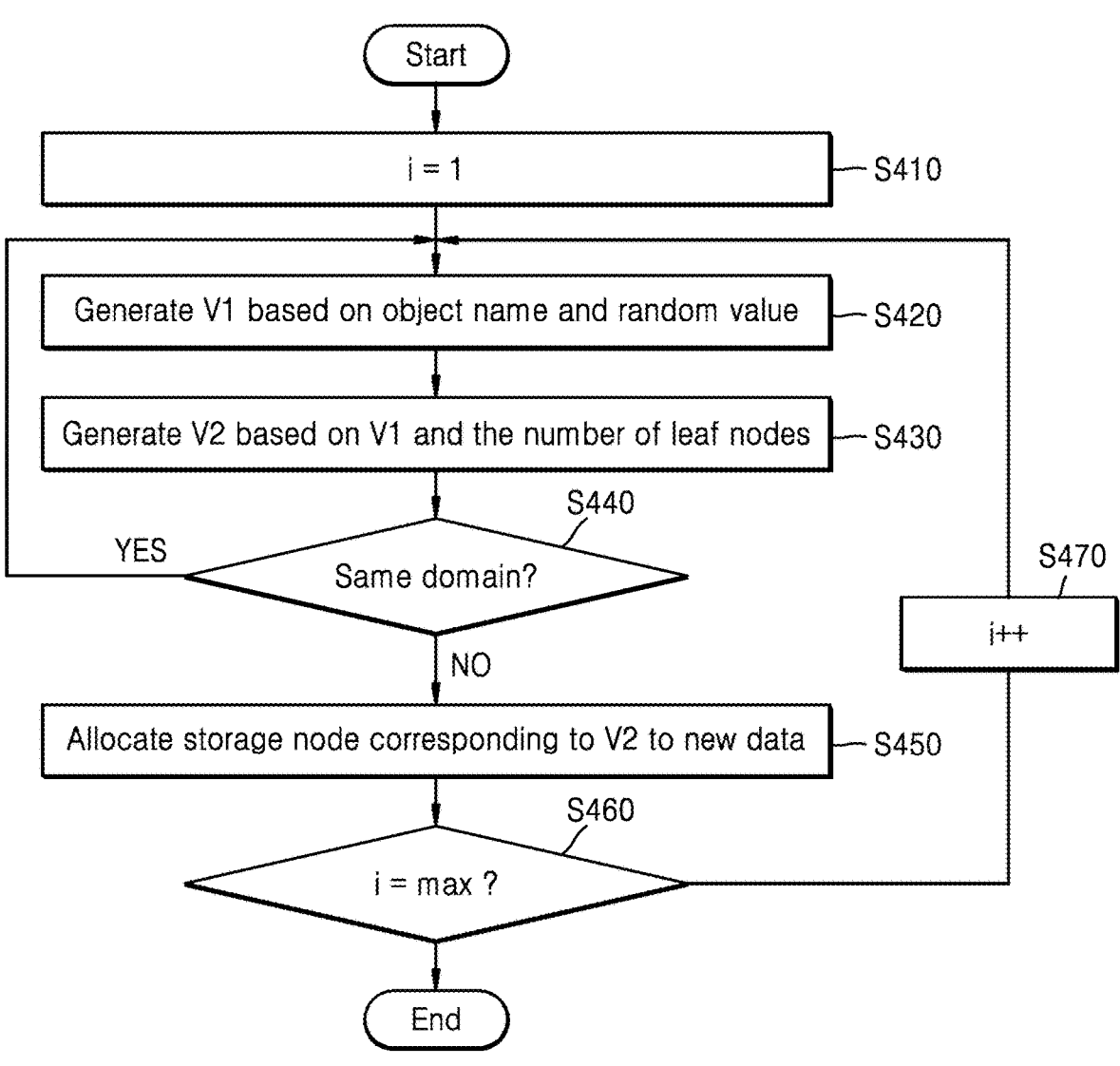
FIG. 11 is a flowchart illustrating an operating method of the distributed storage system of FIG. 1, according to another embodiment.

FIG. 11 is a flowchart illustrating an operating method of the distributed storage system of FIG. 1, according to another embodiment.

An allocating operation will be described with reference to FIG. 11. The distributed storage system 10 may store data and replica of the data in storage nodes so as to guarantee availability. Here, availability may refer to the property in which the distributed storage system 10 may constantly operate normally.

Referring to FIGS. 1 and 11, the distributed storage system 10 may select a storage node in which the data received from the client 300 is to be stored. The distribution manager 100 may perform an allocating operation. In an embodiment, the distribution manager 100 may perform an allocating operation based on the first tree T1.

The distribution manager 100 may select a target storage node based on an object name and a random value of the data based on the first tree T1. The target storage node may indicate a storage node in which data is to be stored. The distribution manager 100 may determine a target domain including the target storage node. The distribution manager 100 may compare a target domain with the previous domain. When the target domain including the target storage node and the previous domain are different from each other, the target storage node may be allocated to new data. The distribution manager 100 may repeat an allocating operation with the number of replicas of data.

In operation S410, the distribution manager 100 may set a variable i to 1. For example, the variable i may be used to describe repetition for the allocating operation, and the scope is not limited thereto.

In operation S420, the distribution manager 100 may generate a first value V1 based on the object name and the random value of the data. For example, the distribution manager 100 may generate the first value V1 by performing a multiplication operation on the object name and the random value of the data.

In operation S430, the distribution manager 100 may generate a second value V2 based on the first value V1 and the number of leaf nodes. The number of leaf nodes may indicate the number of leaf nodes of the first tree T1. The number of leaf nodes may correspond to the number of storage nodes. For example, the number of leaf nodes may correspond to the number of activated storage nodes. In an embodiment, the distribution manager 100 may perform a modular operation on the first value V1 using the number of leaf nodes, thereby generating a second value V2. The second value V2 may be a resultant value in which a modular operation is performed on the first value V1 using the number of leaf nodes.

In operation S440, the distribution manager 100 may determine whether the target domain is identical to the previous domain. In an embodiment, the distribution manager 100 may determine a leaf node corresponding to the second value V2 in the first tree T1. The distribution manager 100 may determine a storage node corresponding to the leaf node determined in the first tree T1 as a target storage node. The distribution manager 100 may determine a target domain including the target storage node. The distribution manager 100 may determine whether the target domain is identical to a domain (i.e., the previous domain) of the previously-selected storage nodes. The distribution manager 100 may determine the target domain so that data and replica of the data may be stored in another domain.

When the target domain is identical to the previous domain, the distribution manager 100 may perform operation S420, and when the target domain is different from the previous domain, the distribution manager 100 may perform operation S450. That is, the distribution manager 100 may determine a domain of the storage nodes selected in the previous loop, i.e., the previous domain and the target domain are identical to each other, so as to store the data and the replicas of the data in another domain. The distribution manager 100 may repeatedly perform operations S420 and S430 until the previous domain and the target domain are different from each other.

In operation S450, the distribution manager 100 may allocate a storage node corresponding to the second value V2 to new data. The distribution manager 100 may select a storage node of a different domain from the previous domain. Thus, the distribution manager 100 may enhance availability of a distributed storage system.

In operation S460, the distribution manager 100 may determine whether the variable i is a maximum value or not. The maximum value may be determined in advance. The maximum value may be the number of data and replicas of the data. That is, the maximum value may be a value obtained by adding 1 to the number of the replicas of the data. When the variable i is the maximum value, an allocating operation may be terminated. Subsequently, the distribution manager 100 may store the data and the replicas of the data in the selected storage node.

When the variable i is the maximum value, operation S470 may be performed. In operation S470, the distribution manager 100 may increase the variable i by 1. Subsequently, the distribution manager 100 may perform operation S420. The distribution manager 100 may repeatedly perform operations S420 to S450, thereby selecting storage nodes in which the data and the replicas of the data are to be stored.

Table 1 shows an example of an allocating operation of the distribution manager 100.

TABLE 1

| DT | DT1 | DT2 | DT2 |
|---|---|---|---|
| i | 1 | 2 | 2 |
| V2 | 1 | 2 | 4 |
| Same domain | X | ○ | X |

For example, it is assumed that the number of replicas of the data is '1'. It is assumed that first data DT1 is a data source and second data DT2 is replica of the data. When the variable i is 1, the distribution manager 100 may calculate the first value V1 based on the object name and the first random value of the first data DT1. The distribution manager 100 may calculate a second value V2 based on the first value V1 and the number of leaf nodes. The second value V2 may be '1'. The first storage node SN1 may be a leaf node of the first tree T1 corresponding to the second value V2 (e.g., '1'). The distribution manager 100 may determine the first domain D1 as a target domain based on the first storage node SN1. The distribution manager 100 may allocate the first storage node SN1 to the first data DT1, because there is no previous domain.

The distribution manager 100 may increase the variable i as '2'. The distribution manager 100 may calculate the first value V1 based on the object name and a second random value of the second data DT2. The distribution manager 100 may calculate a second value V2 based on the first value V1 and the number of leaf nodes. The second value V2 may be '2'. The second storage node SN2 may be a leaf node of the first tree T1 corresponding to the second value V2 (e.g., '2'). The distribution manager 100 may determine the first domain D1 as a target domain based on the second storage node SN2. The distribution manager 100 may compare the previous domain with the target domain. The previous domain may be the first domain D1 corresponding to the first storage node SN1 in which the first data DT1 is to be stored. The second storage node SN2 may not be allocated to the second data DT2, because the previous domain and the target domain are identical to each other.

The distribution manager 100 may calculate the first value V1 based on the object name and a third random value of the second data DT2. The distribution manager 100 may calculate a second value V2 based on the first value V1 and the number of leaf nodes. The second value V2 may be '4'. The fourth storage node SN4 may be a leaf node of the first tree T1 corresponding to the second value V2 (e.g., '4'). The distribution manager 100 may determine the second domain D1 as a target domain based on the fourth storage node SN4. The distribution manager 100 may compare the previous domain with the target domain. The distribution manager 100 may determine that the target domain is different from the previous domain, because the previous domain is the first domain D1 and the target domain is the second domain D2. The distribution manager 100 may allocate the fourth storage node SN4 to the second data DT2.

As described above, the distribution manager 100 may perform an allocating operation of selecting a storage node so as to store new data.

Figure 12:
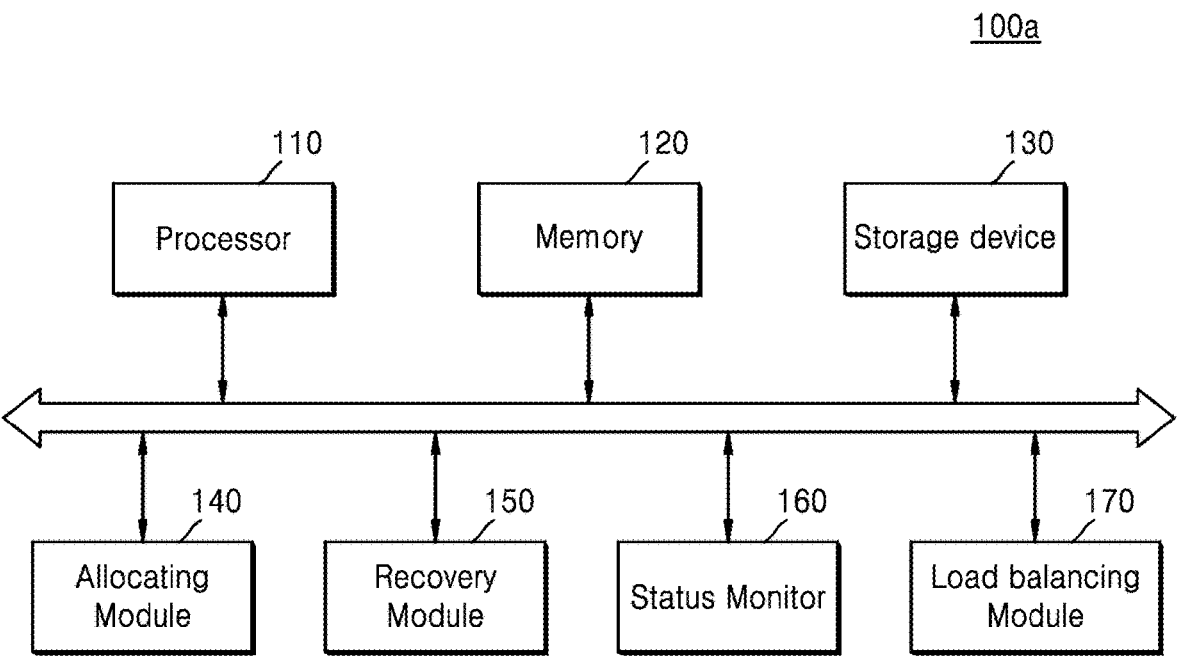
FIG. 12 is a block diagram illustrating the distribution manager of FIG. 1 in more detail.

FIG. 12 is a block diagram illustrating a distribution manager of FIG. 1 in more detail.

Referring to FIGS. 1 and 12, a distribution manager 100a may include a processor 110, a memory 120, a storage device 130, an allocating module 140, and a recovery module 150. The distribution manager 100 may further include a state monitor 160 and a load balancing module 170. The processor 110, the memory 120, the storage device 130, the allocating module 140, and the recovery module 150 shown in FIG. 12 are the same as the processor 110, the memory 120, the storage device 130, the allocating module 140, and the recovery module 150 of FIG. 2 and thus, detailed descriptions thereof will be omitted.

The state monitor 160 may monitor the state of the distributed storage system 10. The state monitor 160 may include information about a plurality of computing nodes. The state monitor 160 may check the state of the plurality of computing nodes periodically. The state monitor 160 may monitor the state of the plurality of computing nodes. For example, the state monitor 160 may monitor the usage rate or a load of the plurality of computing nodes. Alternatively, the state monitor 160 may monitor the processing amount or performance of the plurality of computing nodes.

The state monitor 160 may determine whether a load balancing operation is required or not. The state monitor 160 may detect a computing node that lacks arithmetic resources among the plurality of computing nodes. The state monitor 160 may monitor the usage rate of the plurality of computing nodes, thereby determining whether the usage rate of a specific computing node is greater than a threshold value. When the usage rate of one of the plurality of computing nodes is greater than the threshold value, the state monitor 160 may output load balancing activation signals to the load balancing module 170.

In an embodiment, the state monitor 160 may detect whether failure has occurred. The state monitor 160 may determine whether a recovery operation is required or not. The state monitor 160 may determine whether failure has occurred in one of the plurality of computing nodes and the plurality of storage nodes. When failure has occurred, the state monitor 160 may output recovery activation signals to the recovery module 150. The recovery module 150 may receive the recovery activation signals. The recovery module 150 may perform a recovery operation in response to the recovery activation signals.

The load balancing module 170 may receive the load balancing activation signals from the state monitor 160. The load balancing module 170 may perform a load balancing operation in response to the load balancing activation signals. For example, the load balancing operation may indicate an operation of re-distributing resources when it is determined that arithmetic resources or storage resources are insufficient.

Figure 13:
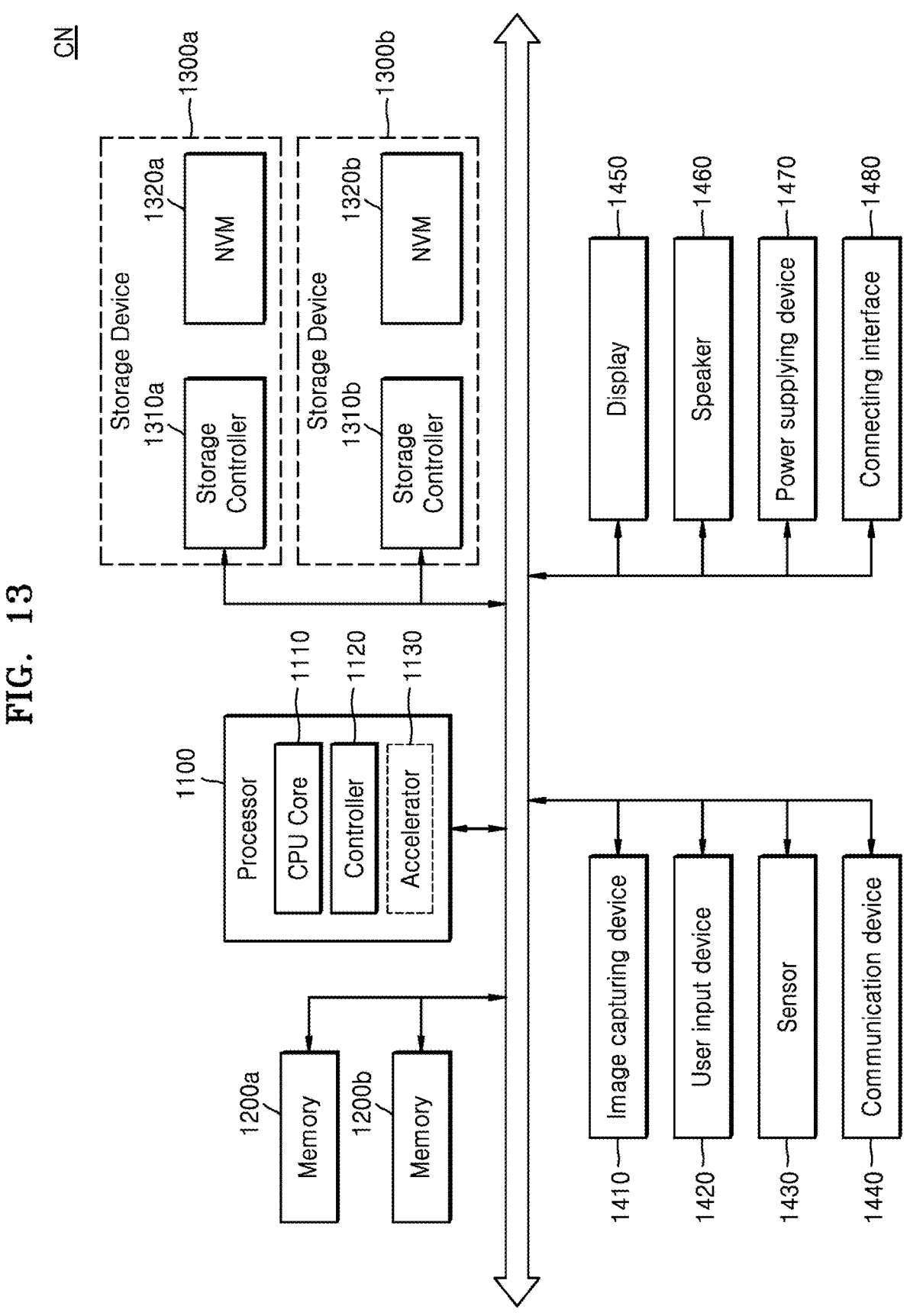
FIG. 13 is a block diagram illustrating an example of each of a plurality of computing nodes of FIG. 1.

FIG. 13 is a block diagram illustrating an example of each of a plurality of computing nodes of FIG. 1.

A computing node CN of FIG. 13 may be applied to each of the plurality of computing nodes of FIG. 1. Referring to FIG. 13, the computing node CN may be a personal computer, a laptop computer, a server, a media player, or an automotive device, such as a navigation device. The computing node CN may include one or more of a main processor 110, memories 1200a and 1200b and storage devices 1300a and 1300b, and may further include an image capturing device 1410, a user input device 1420, a sensor 1430, a communication device 1440, a display 1450, a speaker 1460, a power supplying device 1470, and a connecting interface 1480.

The main processor 1100 may control the overall operation of the computing node CN, more specifically, operations of other elements that constitute the computing node CN. The main processor 110 may be implemented as a general-purpose processor, a dedicated processor, an application processor, or the like.

The main processor 1100 may include one or more CPU cores 1110 and may further include a controller 1120 for controlling the memories 1200a and 1200b and/or the storage devices 1300a and 1300b. According to embodiments, the main processor 1100 may further include an accelerator 1130 that is a dedicated circuit for a high-speed data operation such as an AI data operation or the like. The accelerator 1130 may include a graphics processing unit (GPU), a neural processing unit (NPU) and/or a data processing unit (DPU), and may also be implemented with a separate chip physically disaggregated from other components of the main processor 1100.

The memories 1200a and 1200b may be used as a main memory device of the computing node CN, may include a nonvolatile memory such as an SRAM and/or a DRAM, etc., but may also include a nonvolatile memory such as a flash memory, a PRAM and/or a RRAM, etc. The memories 1200a and 1200b may also be implemented within the same package as the main processor 110.

The storage devices 1300a and 1300b may function as non-volatile storage devices for storing data regardless of the supply of power and may have a relatively large storage capacity compared to the storage capacity of the memories 1200a and 1200b. The storage devices 1300a and 1300b may include storage controllers 1310a and 1310b, and non-volatile memory (NVM) 1320a and 1320b for storing data under control of the storage controllers 1310a and 1310b. Each of the non-volatile memories 1320a and 1320b may include a flash memory having a 2D structure or 3D V-NAND structure, but may also include a different type of non-volatile memory such as a PRAM and/or a RRAM.

The storage devices 1300a and 1300b may be included in the computing node CN while being physically disaggregated from the main processor 1100, and may also be implemented in the same package as the main processor 1100. Also, the storage devices 1300a and 1300b may have a shape such as an SSD or a memory card to be detachably combined with other components of the computing node CN via an interface, such as the connecting interface 1480 to be described later. The storage devices 1300a and 1300b may have a device to which standard protocols such as UFS, eMMC or NVMe are applied, but embodiments are not limited thereto. In an embodiment, the computing node CN may not include the storage devices 1300a and 1300b.

The image capturing device 1410 may capture a still image or moving image and may be a camera, a camcorder, and/or a webcam, etc.

The user input device 1420 may receive various types of data input by a user of the computing node CN and may be a touch pad, a key pad, a keyboard, a mouse, and/or a microphone, etc.

The sensor 1430 may sense various types of physical quantity that may be obtained from the outside of the computing node CN and may convert the sensed physical quantity into electrical signals. The sensor 1430 may be a temperature sensor, a pressure sensor, an illuminance sensor, a position sensor, an acceleration sensor, a biosensor, and/or a gyroscope.

The communication device 1440 may transmit and receive signals to and from other devices outside the computing node CN according to various communication protocols. The communication device 1440 may include an antenna, a transceiver, and/or a modem, etc.

The display 1450 and the speaker 1460 may function as an output device for outputting visual information and auditory information, respectively, to the user of the computing node CN. The power supplying device 1470 may properly convert power supplied from a battery (not shown) embedded in the computing node CN and/or an external power supply and may supply the power to each of elements of the computing node CN.

The connecting interface 1480 may provide a connection between the computing node CN and an external device that is connected to the computing node CN and may exchange data with the system 1000. The connecting interface 1480 may be implemented in various interface methods such as ATA, SATA, e-SATA, SCSI, SAS, PCI, PCIe, NVMe, NVMe-OF, IEEE 1394, a USB, an SD card, MMC, eMMC, a UFS, an eUFS, a CF card interface, and the like.

Embodiments may be changed, in addition to the above-described embodiments.

Various changes in form and details may be made therein without departing from the spirit and scope of the following claims.

What is claimed is:

1. An operating method of a distributed storage system, the distributed storage system comprising a domain comprising a plurality of computing nodes and a plurality of storage nodes communicating with the plurality of computing nodes via a non-volatile memory express over fabrics (NVMe-oF) protocol and a distribution manager, the operating method comprising:

detecting, by the distribution manager, an occurrence of a failure of a first node in the domain, wherein a second node communicates in the distributed storage system via the first node; and performing, by the distribution manager, a recovery operation based on a first tree and a second tree in response to the occurrence of the failure by re-allocating a third node of the domain to the second node, whereby the second node is able to communicate in the distributed storage system via the third node, wherein the first tree is generated based on a logical connection state between the plurality of computing nodes and the plurality of storage nodes and a storage capacity of the plurality of storage nodes, and the second tree is generated based on a physical connection state between the plurality of computing nodes and the plurality of storage nodes and a usage rate of the plurality of storage nodes.

2. The operating method of claim 1, wherein the first tree is dynamic, and the second tree is static.

3. The operating method of claim 1, wherein the performing of the recovery operation comprises:

performing a first recovery operation based on the first node being a computing node; and performing a second recovery operation based on the first node being a storage node.

4. The operating method of claim 3, wherein the performing of the first recovery operation further comprises:

determining a fault domain comprising the second node, wherein the second node is a storage node allocated to the first node, in the second tree;

selecting a peer storage node among a second plurality of storage nodes comprised in the fault domain, from the second tree;

determining the third node as that node which is a computing node allocated to the peer storage node; and re-allocating the third node to the second node.

5. The operating method of claim 4, wherein the selecting of the peer storage node among the second plurality of storage nodes comprises selecting, from the second tree, the peer storage node as that storage node having a greatest weight among the second plurality of storage nodes, wherein a weight of a leaf node of the second tree indicates a second usage rate of a computing node allocated to a storage node corresponding to the leaf node, and the weight is inversely proportional to the second usage rate of the computing node.

6. The operating method of claim 4, wherein the performing of the first recovery operation further comprises updating the first tree after the third node is allocated to the second node.

7. The operating method of claim 6, wherein the updating of the first tree comprises:

initializing a first child pointer of the fault domain indicating the first node in the first tree;

updating a second child pointer of the third node as the second node in the first tree; and updating a parent pointer of the second node to indicate the third node in the first tree.

8. The operating method of claim 3, wherein the performing of the second recovery operation further comprises:

determining, in the second tree, a fault domain including the first node;

selecting, from the second tree, the third node as that node among a second plurality of storage nodes comprised in the fault domain; and re-allocating the third node to the second node that is a computing node allocated to the first node.

9. The operating method of claim 8, wherein the selecting, from the second tree, of the third node comprises selecting, from the second tree, the third node as that node having a deactivated state among the second plurality of storage nodes, wherein the deactivated state indicates a state of a storage node not logically connected to the computing node.

10. The operating method of claim 1, further comprising performing, by the distribution manager, an allocating operation of selecting a storage node so as to store new data.

11. The operating method of claim 10, wherein the performing of the allocating operation comprises:

selecting a target storage node based on an object name and a random value of data from the first tree; and allocating the target storage node to the data based on a target domain, wherein the target domain comprises the target storage node, and the target domain is different from a previous domain.

12. The operating method of claim 11, further comprising repeatedly performing the allocating operation with a number of replicas of the data.

13. The operating method of claim 11, wherein the performing of the allocating operation comprises:

comparing the target domain with the previous domain.

14. The operating method of claim 1, wherein the recovery operation does not accompany a topology change.

15. The operating method of claim 1, further comprising monitoring, by the distribution manager, a state of the plurality of computing nodes.

16. The operating method of claim 1, further comprising performing, by the distribution manager, a load balancing operation based on a second usage rate of a specific computing node being greater than a threshold value.

17. A distributed storage system comprising:

a plurality of computing nodes;

a plurality of storage nodes configured to communicate with the plurality of computing nodes through a non-volatile memory express over fabrics (NVMe-oF) protocol; and a distribution manager configured to detect a first node in which a failure has occurred, wherein a second node communicates in the distributed storage system via the first node, and to perform a recovery operation based on a first tree and a second tree by re-allocating a third node of a fault domain to the second node, whereby the second node is able to communicate in the distributed storage system via the third node, and wherein the fault domain comprises the second node, wherein the first tree is generated based on a logical connection state between the plurality of computing nodes and the plurality of storage nodes and a storage capacity of the plurality of storage nodes, and the second tree is generated based on a physical connection state between the plurality of computing nodes and the plurality of storage nodes and a usage rate of the plurality of storage nodes.

18. The distributed storage system of claim 17, wherein the distribution manager is further configured to determine the fault domain comprising the second node as a storage node allocated to the first node based on the first node being a computing node, to select a peer storage node among a second plurality of storage nodes comprised in the fault domain, to determine the third node as that computing node allocated to the peer storage node and to perform the recovery operation by re-allocating the third node to the second node.

19. The distributed storage system of claim 17, wherein the distribution manager is further configured to determine the fault domain comprising the first node from the second tree based on the first node being a storage node, to select the third node among a second plurality of storage nodes comprised in the fault domain, from the second tree and to perform the recovery operation by re-allocating the third node to the second node as a computing node allocated to the first node.

20. An operating method of a distributed storage system, the distributed storage system comprising a domain comprising a plurality of computing nodes and a plurality of storage nodes communicating with the plurality of computing nodes via a non-volatile memory express over fabrics (NVMe-oF) protocol and a distribution manager, the operating method comprising:

detecting, by the distribution manager, an occurrence of a failure of a first node, wherein a second node communicates in the distributed storage system via the first node;

determining a fault domain comprising the second node as a storage node based on a first tree and determining a second tree based on the first node being a computing node;

selecting, from the second tree, a peer storage node among a second plurality of storage nodes comprised in the fault domain;

determining a third node that is a computing node, wherein the third node is allocated to the peer storage node; and re-allocating the third node to the second node, whereby the second node is able to communicate in the distributed storage system via the third node, wherein the first tree is generated based on a logical connection state between the plurality of computing nodes and the plurality of storage nodes and a storage capacity of the plurality of storage nodes, and the second tree is generated based on a physical connection state between the plurality of computing nodes and the plurality of storage nodes and a usage rate of the plurality of storage nodes.

* * * * *